| (12) | United States Patent | (10) Patent No.: | US 8,464,011 B2 |
|---|---|---|---|
| | Krig | (45) Date of Patent: | Jun. 11, 2013 |

(54) METHOD AND APPARATUS FOR PROVIDING SECURE REGISTER ACCESS

(75) Inventor: Scott A. Krig, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 768 days.

(21) Appl. No.: 12/606,841

(22) Filed: Oct. 27, 2009

(65) Prior Publication Data

US 2010/0106929 A1 Apr. 29, 2010

Related U.S. Application Data

(60) Provisional application No. 61/108,758, filed on Oct. 27, 2008, provisional application No. 61/108,767, filed on Oct. 27, 2008, provisional application No. 61/108,765, filed on Oct. 27, 2008.

(51) Int. Cl.
*G06F 12/00* (2006.01)

(52) U.S. Cl.
USPC ........... 711/163; 711/101; 711/103; 711/156; 365/185.33

(58) Field of Classification Search
USPC .............. 711/163, 156, 101, 103; 365/185.33
See application file for complete search history.

(56) References Cited

U.S. PATENT DOCUMENTS

| 4,713,753 | A * | 12/1987 | Boebert et al. ................ 711/164 |
|---|---|---|---|
| 4,787,031 | A | 11/1988 | Karger et al. |
| 5,107,443 | A | 4/1992 | Smith et al. |
| 5,825,879 | A | 10/1998 | Davis |
| 5,881,287 | A | 3/1999 | Mast |
| 5,958,045 | A * | 9/1999 | Pickett .......................... 712/229 |
| 6,148,403 | A | 11/2000 | Haneda et al. |
| 6,775,779 | B1 | 8/2004 | England et al. |
| 7,007,304 | B1 | 2/2006 | Girard et al. |
| 7,055,038 | B2 | 5/2006 | Porter et al. |
| 2009/0258678 | A1 * | 10/2009 | Chava et al. .................. 455/557 |
| 2009/0285390 | A1 * | 11/2009 | Scherer et al. .................. 380/44 |
| 2009/0287895 | A1 * | 11/2009 | Foley et al. .................... 711/163 |

FOREIGN PATENT DOCUMENTS

WO WO02/25416 3/2002

OTHER PUBLICATIONS

Foley, Denis et al., "Secure Memory Access System," U.S. Appl. No. 12/121,573, filed May 15, 2008; 20 pp.

Scherer, Stefan T. et al., "Integrated Circuit With Secured Software Image and Method Therefor," U.S. Appl. No. 12/122,444, filed May 16, 2008; 28 pp.

* cited by examiner

*Primary Examiner* — Stephen Elmore

(74) *Attorney, Agent, or Firm* — Faegre Baker Daniels LLP

(57) ABSTRACT

The method and accompanying apparatus provides secure register access. In one example, as part of a secure boot process, data is written into a managed secure register (MSR) register and access policy data is written into programmable MSR policy registers. During run-time, the MSR register securely stores data in compliance with the programmable register access policy data. Access policy is enforced during run-time based on the programmable register access policy data.

12 Claims, 17 Drawing Sheets

| REGISTER NAME | SIZE (BITS) | ACCESS MODE | DESCRIPTION | |
|---|---|---|---|---|
| $F_1$ POINTER | 64 | I | | |
| $F_1$ SIZE | 64 | I | | |
| $F_1$ SIGNATURE TYPE | 8 | I | 0x1=SHA-1, 0x2=SHA-256, ETC. | 336 |
| $F_1$ SIGNATURE | 1024 | I | | |
| ... | ... | ... | ... | |
| $F_4$ POINTER | 64 | I | | |
| $F_4$ SIZE | 64 | I | | |
| $F_4$ SIGNATURE TYPE | 8 | I | 0x1=SHA-1, 0x2=SHA-256, ETC. | 338 |
| $F_4$ SIGNATURE | 1024 | I | | |
| ... | ... | ... | ... | |
| SIGNATURE-COMPARE STATUS | 8 | R | BIT 0 : $F_1$ SIGNATURE COMPARE SUCCESS<br>BIT 1 : $F_1$ SIGNATURE COMPARE FAILURE<br>...<br>BIT 6 : $F_4$ SIGNATURE COMPARE SUCCESS<br>BIT 7 : $F_4$ SIGNATURE COMPARE FAILURE | 340 |
| FUNCTION-STATE STATUS | 8 | R | BIT 0 : $F_1$ RUNNING<br>BIT 1 : $F_1$ HALTED<br>...<br>BIT 6 : $F_4$ RUNNING<br>BIT 7 : $F_4$ HALTED | 342 |

FIG. 3

| | | | | |
|---|---|---|---|---|
| 326 → | FUNCTION-COMPLETION NOTIFICATION | 8 | I | BIT 0 : $F_1$ ASSERT INTERRUPT<br>BIT 1 : $F_1$ ASSERT EXTERNAL TRIGGER<br>...<br>BIT 6 : $F_4$ ASSERT INTERRUPT<br>BIT 7 : $F_4$ ASSERT INTERRUPT | ← 344 |
| 328 → | SIGNATURE-FAIL NOTIFICATION | 8 | I | BIT 0 : $F_1$ ASSERT INTERRUPT<br>BIT 1 : $F_1$ ASSERT EXTERNAL TRIGGER<br>...<br>BIT 6 : $F_4$ ASSERT INTERRUPT<br>BIT 7 : $F_4$ ASSERT INTERRUPT | ← 346 |
| 330 → | E CONTROL | 8 | W/R | BIT 0 : $F_1$ LAUNCH FUNCTION 1<br>BIT 1 : $F_1$ HALT FUNCTION 1<br>...<br>BIT 6 : $F_4$ LAUNCH FUNCTION 4<br>BIT 7 : $F_4$ HALT FUNCTION 4 | ← 348 |

The table above is bracketed as 300. Columns 332 and 334 correspond to the width (8) and access mode columns.

*NOTE ON ACCESS MODES:
R=READ
W=WRITE
I=INVISIBLE AFTER WRITE (*SOFTWARE FUSED REGISTER (SFR)-ONLY VISIBLE FOR WRITE AFTER POWER-ON, ONLY VISIBLE FOR READ DURING INTERRUPT PROCESSING TO SECURE INTERRUPT HANDLER, INVISIBLE OTHERWISE*). THE I REGISTERS ARE ALSO MANAGED SECURE REGISTERS, WHICH ARE ONLY VISIBLE TO SELECTED FUNCTIONS WHICH ARE IDENTIFIED EITHER BY A WELL UNDERSTOOD AUTHENTICATION PROCESS OR BY A HW STATE SUCH AS NMI INTERRUPT ASSERTED.

FIG. 4

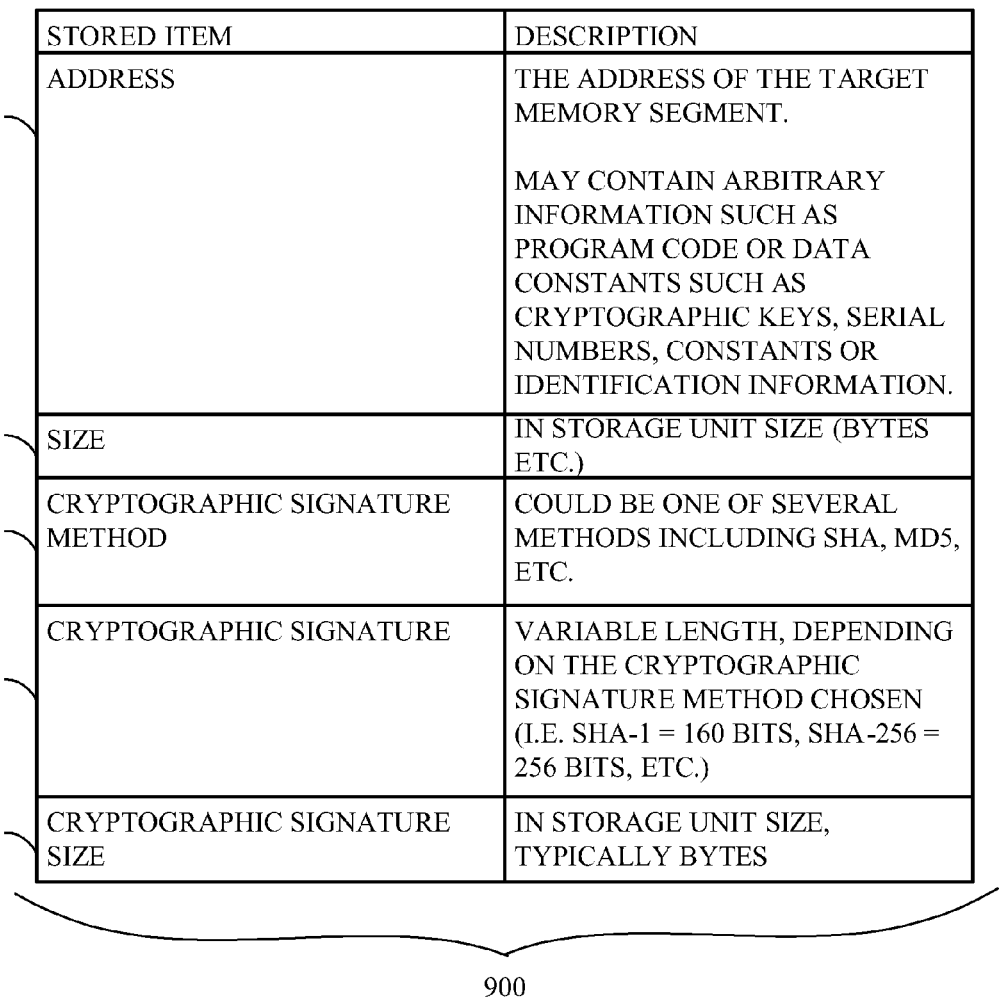

| STORED ITEM | DESCRIPTION |
|---|---|
| ADDRESS | THE ADDRESS OF THE TARGET MEMORY SEGMENT.<br><br>MAY CONTAIN ARBITRARY INFORMATION SUCH AS PROGRAM CODE OR DATA CONSTANTS SUCH AS CRYPTOGRAPHIC KEYS, SERIAL NUMBERS, CONSTANTS OR IDENTIFICATION INFORMATION. |
| SIZE | IN STORAGE UNIT SIZE (BYTES ETC.) |
| CRYPTOGRAPHIC SIGNATURE METHOD | COULD BE ONE OF SEVERAL METHODS INCLUDING SHA, MD5, ETC. |
| CRYPTOGRAPHIC SIGNATURE | VARIABLE LENGTH, DEPENDING ON THE CRYPTOGRAPHIC SIGNATURE METHOD CHOSEN (I.E. SHA-1 = 160 BITS, SHA-256 = 256 BITS, ETC.) |
| CRYPTOGRAPHIC SIGNATURE SIZE | IN STORAGE UNIT SIZE, TYPICALLY BYTES |

| REGISTER NAME | OFFSET (BYTES) | SIZE (BYTES) | DESCRIPTION | VALUES | ACCESS |
|---|---|---|---|---|---|
| 1002 TARGET MEMORY SEGMENT START ADDRESS | 0 | 8 | START OF MEMORY SEGMENT | UNSIGNED | R/W |
| 1004 TARGET MEMORY SEGMENT SIZE | 8 | 8 | SIZE OF MEMORY SEGMENT | UNSIGNED | R/W |
| 1006 EXPECTED SIGNATURE RESULT | 16 | 64 | SIGNATURE LOADED BY SOFTWARE<br><br>*NOT ALL BYTES ARE USED FOR EACH SIGNATURE TYPE | UNSIGNED | R/W |
| 1008 ACTUAL SIGNATURE RESULT | 80 | 32 | ACTUAL SIGNATURE CALCULATED BY SVE | UNSIGNED | R |
| 1010 STATUS | 84 | 4 (1030) | STATUS BITS:<br><br>BIT 1: SVE INITIALIZED<br>BIT 2: SIGNATURE IN PROGRESS<br>BIT 3: SIGNATURE CALCULATED<br>BIT 4: IDLE<br>BIT 5: SIGNATURE ERROR DETECTED<br>BIT 6: SIGNATURE MATCH DETECTED<br>BIT 7: INTERNAL ERROR<br>BIT 8: HALTED | UNSIGNED | R |

FIG. 10

| | | | | | |
|---|---|---|---|---|---|
| CONTROL | 88 | 4 | CONTROL BITS:<br><br>BIT 1: INITIALIZE SVE (CLEAR ALL SETTINGS)<br>BIT 2: RUN ONCE<br>BIT 3: RUN AT INTERVALS (SEE INTERVAL REGISTER)<br>BIT 4: RUN ON EXTERNAL TRIGGER SIGNAL<br>BIT 5: ASSERT HW INTERRUPT ON SIGNATURE ERROR<br>BIT 6: ASSERT HW CONTROL LINE ON SIGNATURE ERROR<br>BIT 7: CLEAR MEMORY RANGE ON ERROR (WIPE MEMORY RANGE TO 0!)<br>BIT 8: STOP SVE ON SIGNATURE ERROR<br>BIT 9: ASSERT HW INTERRUPT ON SIGNATURE MATCH<br>BIT 10: ASSERT HW CONTROL LINE ON SIGNATURE MATCH<br>BIT 11: FORCE HALT | UNSIGNED | R/W |

The table above is labeled 802, with 1012 pointing to the CONTROL column and 1026 pointing to the control bits column.

| REGISTER NAME | SIZE (BITS) | ACCESS MODE* | DESCRIPTION |
|---|---|---|---|
| M POINTER | 64 | VARI-ABLE | MANAGEMENT FUNCTION ADDRESS |
| M SIZE | 64 | VARI-ABLE | MANAGEMENT FUNCTION LENGTH |
| M SIGNATURE TYPE | 8 | VARI-ABLE | 0x1=SHA-1, 0x2=SHA-256, ETC. |
| M SIGNATURE | 1024 | VARI-ABLE | VARIABLE, DEPENDING UPON SIGNATURE TYPE |
| ACCESS POLICY (SW-FUSED) *WRITTEN ONCE AFTER POWER-ON AND SUBSEQUENTLY FUSED SO NO CHANGES ARE ALLOWED. *MAY BE PROGRAMMED TO BE INVISIBLE AFTER WRITING, OR READ-ONLY, WHICH IS THE DEFAULT. THIS REGISTER CONTROLS ACCESS POLICY FOR THE ACTIVE REGISTER. IF THIS ACCESS POLICY IS MANAGED (BIT 1 SET) ONLY THE MANAGEMENT FUNCTION MAY ACCESS THE MSR OTHERWISE AN ACCESS VIOLATION OCCURS AND ERROR POLICY IS ENFORCED. | 32 | F | BIT 1: MANAGED ACCESS VIA SIGNED FUNCTION BIT 2: READ-ONLY AFTER WRITE BIT 3: INVISIBLE AFTER WRITE BIT 4: VISIBLE ON EXTERNAL TRIGGER BIT 5: VISIBLE ON INTERRUPT BIT 6: INVISIBLE ON EXTERNAL TRIGGER BIT 7: INVISIBLE ON INTERRUPT |

FIG. 15

| REGISTER NAME | SIZE (BITS) | ACCESS MODE* | DESCRIPTION |
|---|---|---|---|
| ERROR POLICY (SW-FUSED) *WRITTEN ONCE AFTER POWER-ON AND SUBSEQUENTLY FUSED SO NO CHANGES ARE ALLOWED. *MAY BE PROGRAMMED TO BE INVISIBLE AFTER WRITING, OR READ-ONLY (DEFAULT). THIS REGISTER CONTROLS ERRORPOLICY WHEN ILLEGAL ACCESS OCCURS. | 32 | F | ON ILLEGAL MSR ACCESS: BIT 1: ASSERT INTERRUPT BIT 2: ASSERT EXTERNAL TRIGGER BIT 3: CLEAR ALL MSR REGISTERS TO 0 BIT 4: MAKE MSR INVISIBLE TO ALL ACCESS |
| ACTIVE REGISTER (MSR REGISTER) | N | VARIABLE | APPLICATION-SPECIFIC REGISTER CONTENTS. USED TO STORE APPLICATION-SPECIFIC INFORMATION SUCH AS CRYPTOGRAPHIC PUBLIC/PRIVATE KEY PAIRS, ETC. |

FIG. 16

METHOD AND APPARATUS FOR PROVIDING SECURE REGISTER ACCESS

CROSS-REFERENCE TO RELATED APPLICATIONS

The present patent application claims priority from and the benefit of U.S. Provisional Patent Application No. 61/108,767 filed Oct. 27, 2008, entitled MANAGED SECURE REGISTERS, which is hereby incorporated herein by reference in its entirety. The present patent application also claims priority from and the benefit of U.S. Provisional Patent Application No. 61/108,758 filed Oct. 27, 2008, entitled HARDENED FUNCTION ENGINE, which is hereby incorporated herein by reference in its entirety. The present patent application also claims priority from and the benefit of U.S. Provisional Patent Application No. 61/108,765 filed Oct. 27, 2008, entitled SIGNATURE VERIFICATION ENGINE, which is hereby incorporated herein by reference in its entirety.

FIELD OF THE INVENTION

The present disclosure relates generally to a method and apparatus for providing secure register access.

BACKGROUND OF THE INVENTION

Existing computing systems often attempt to protected the integrity of data stored in registers by implementing a credential-based security system. In such a system, access to registers (i.e., locations in memory that can be read/written) is restricted to those functions (i.e., software programs) whose credentials are verified. This verification can be accomplished by logic within the computing system. However, credential-based security systems suffer from a number of drawbacks. For example, credential-based security systems are only capable of enforcing one data-access policy. Specifically, a function with viable credentials will be permitted to access the data within the register while a function without viable credentials will be denied access to the data. Because these systems rely solely on credential-based verification as a mechanism for data access, they are susceptible to a scenario where a rogue function improperly obtains viable credentials and is therefore permitted to access the data sought to be protected. Furthermore, these systems assume that credential-based data access is the appropriate security policy for all types of data sought to be protected. However, it is often desirable to protect different types of data with different access policies.

Existing software systems often utilize credential/key-based techniques to ensure the security of data being transferred within the system. For example, one regularly utilized credential/key-based technique is that of data encryption/decryption. In this technique, encryption software executes an algorithm that is designed to encrypt computer data in such a way that the original data cannot be recovered by a program unless that program has the appropriate credential/key. These systems tend to concentrate their security efforts on verifying the credential/key being passed between programs, rather than on verifying the access rights of the programs themselves. In this manner, rogue programs with viable credentials/keys can obtain and decrypt data sought to be protected, thus compromising the security efforts of the system.

Furthermore, existing computing systems utilize a number of methods to protect against malicious programming attacks and/or data corruption from external sources. For example, one known technique includes the use of anti-virus software. Anti-virus software is a software-based technique that utilizes methods such as signature-based detection, malicious activity detection, and/or a heuristic-based method (e.g., file analysis or file detection) to prevent, detect, and remove malware, including computer viruses, worms, trojan horses, etc. However, a number of drawbacks are associated with utilizing anti-virus software as a means for system protection. For example, users of anti-virus software may have a difficult time understanding the prompts and decisions that the software presents them with. This can lead to a scenario in which a user makes an incorrect decision leading to a system-security breach. Furthermore, anti-virus software is known to detect "false-positives," meaning that the software characterizes innocent software code (i.e., software programs) and/or data as being malicious. In this circumstance, the anti-virus software will often remove the innocent software code and/or data, thereby seriously hampering the computing system's functionality.

Another technique involves authenticating software code and/or data constants that the system wishes to execute at load-time during a secure boot process. This is may be accomplished, for example, via a signature verification technique as recognized by those having ordinary skill in the art. A load-time authentication technique also suffers from drawbacks. For example, in this technique, the authentication only takes place once, during the secure boot process. Thus, a system utilizing a load-time authentication technique is susceptible to programming attacks and/or data corruption at run-time, where run-time is recognized as being the time period immediately following load-time (i.e., after the secure boot process).

Known techniques, such as those discussed above, are frequently not suitable for use in digital rights management (DRM) systems. For example, in current DRM system implementations, secure DRM code uses driver code to communicate directly with a GPU. However, this driver code is frequently not secure, allowing a "man-in-the-middle" attack to replace the driver code with arbitrary code which could be used to impersonate the GPU hardware and thus intercept all protected content sent to the GPU, thereby compromising the DRM system.

Thus, a need exists to provide secure register access based on one of several different policy options.

BRIEF DESCRIPTION OF THE DRAWINGS

The invention will be more readily understood in view of the following description when accompanied by the below figures and wherein like reference numerals represent like elements, wherein:

FIGS. 3-4 are a representation of a secure programmable register set.

FIG. 9 is a representation of a target memory segment signature record set in accordance with one embodiment of the disclosure.

FIGS. 10-12 are a representation of a programmable register set register set in accordance with one embodiment of the disclosure.

FIGS. 15-16 are a representation of a programmable register set in accordance with one embodiment of the disclosure.

DETAILED DESCRIPTION OF THE PREFERRED EMBODIMENTS

Figure 1:
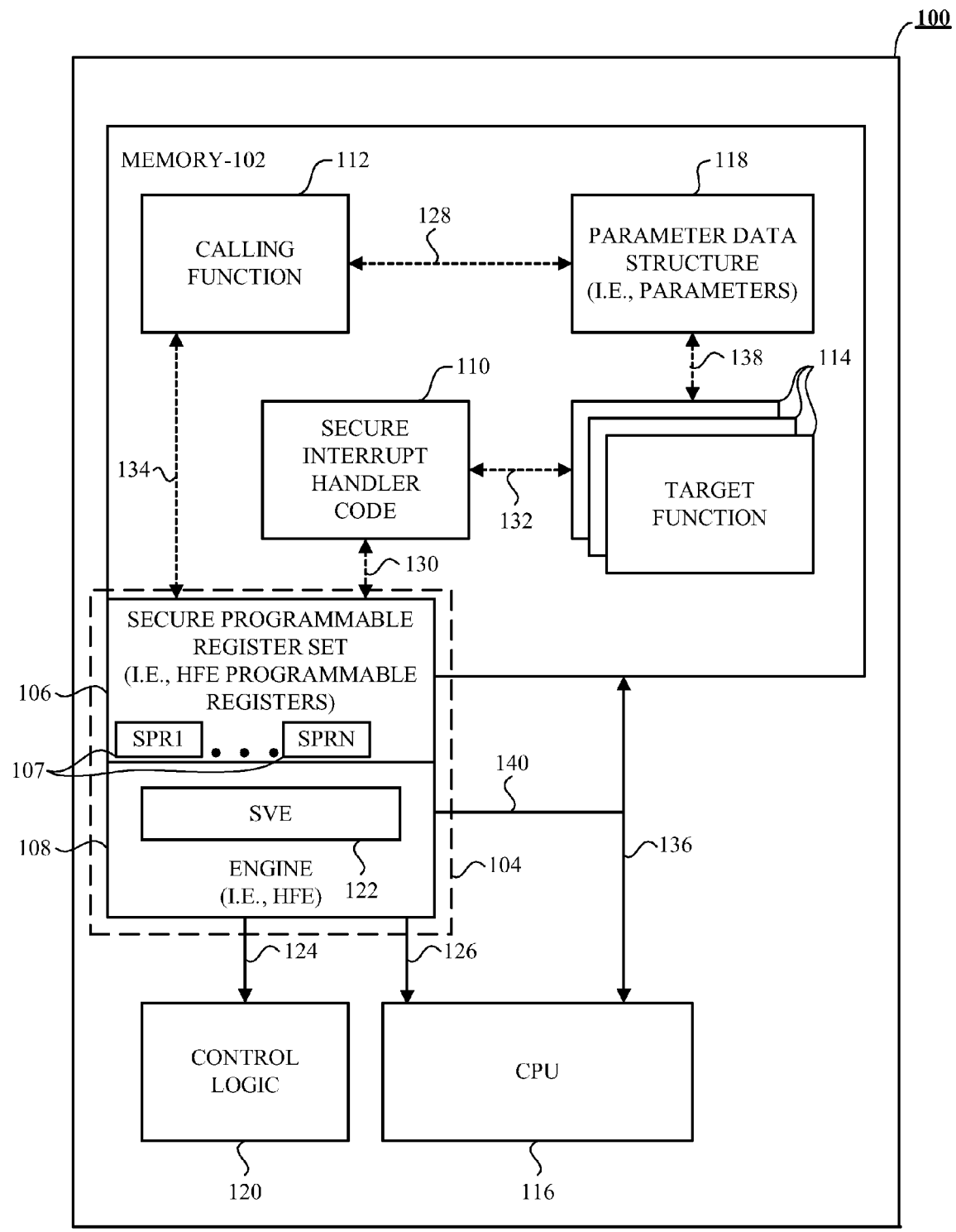
FIG. 1 is a block diagram generally depicting one example of a device for providing security among a calling function and a target function.

Generally, the disclosed method and accompanying apparatus (e.g., an integrated circuit) provides secure register access. In one example of the method, as part of a secure boot process, data is written into a managed secure register (MSR) register and access policy data is written into programmable MSR policy registers. In this example, during run-time, the MSR register securely stores data in compliance with the written register access policy data. In this example, access policy is enforced during run-time based on the written register access policy data.

In another example of the method, the MSR register is secured during run-time of a device by providing at least one of: write once register programming based on the written register access policy data; signature verification-based register access based on the written register access policy data; or register visibility control for access based on the written register access policy data.

In yet another example of the method, the method further includes writing error policy data to the MSR policy registers during the secure boot process and controlling error policy during run-time when illegal register access occurs in response to written error policy data.

In another example of the method, signature verification-based register access is provided. In this example, the signature verification-based register access is based on the written register access policy data. Also, in this example, the signature verification-based register access is provided by using a signature verification engine to verify a signature of a secure management function prior to allowing access to the MSR register.

In one example of the integrated circuit, the integrated circuit includes a programmable register set and logic. In this example, the programmable register set includes programmable register access policy data and the logic is operatively responsive to the programmable register access policy data to secure registers during run-time by providing at least one of: write once register programming based on the stored programmable register access policy data; signature verification-based register access based on the stored programmable register access policy data; or register visibility control for access based on the stored programmable register access policy data.

In another example of the integrated circuit, the programmable register set further includes programmable error policy data. In this example, the logic controls error policy when illegal register access occurs in response to the programmable error policy data. In another example of the integrated circuit, the programmable register set includes at least one managed secure register (MSR) register that securely stores data in compliance with the programmable register access policy data. In yet another example of the integrated circuit, the MSR register comprises access mode data defined by the programmable register access policy data.

In another example of the integrated circuit, the logic is operatively responsive to the programmable register access policy data to secure MSR registers during run-time. In this example, the logic secures MSR registers during run-time by providing signature verification-based register access based on the stored programmable register access policy data. Furthermore, in this example, the logic provides signature verification-based register access by using a signature verification engine to verify a signature of a secure management function prior to allowing access to a secure register.

Among other advantages, the disclosed method and integrated circuit provide secure register access by providing programmable policy options to restrict access to a managed set of registers. These policy options include, for example, WRITE-ONCE then subsequently READ-ONLY, WRITE-ONCE then subsequently INVISIBLE, VISIBLE ONLY DURING KNOWN INTERRUPTS (NMI for example), VISIBLE ONLY WHEN CERTAIN HW LINES ARE ACTIVE (multi-port bus access policy), or VISIBLE ONLY DURING AUTHENTICATED FUNCTION ACCESS (managed access). During a secure boot process, the programmable policy is set and software-fused into the MSR registers so that the policy cannot be changed until a subsequent power-on. Other advantageous features include: software-fused write-once programming for run-time access policy; managed access enforced by policy-based secure register manager logic for a single secure signed function; and register hiding feature to control run-time bus-level visibility. Other advantages will be recognized by those of ordinary skill in the art.

The present disclosure also provides a device and accompanying apparatus (e.g., an integrated circuit) and method for providing security among a calling function, such as any executable code, and at least one target function, such as any executable code that the calling function wishes to have execute. In one example, the device includes an engine operative to verify a signature of secure interrupt handler code during run-time in response to the calling function wanting to call the at least one target function. In this example, the engine is also operative to verify at least a signature of the at least one target function during run-time in response to a successful signature verification of the secure interrupt handler code. Further, in this example, the engine is also operative to allow execution of the at least one target function in response to a successful signature verification of the at least one target function.

In one example, an interrupt is generated to launch the secure interrupt handler code if the signatures of the secure interrupt handler code and at least one target function verify. The at least one target function is then identified from values stored within a secure programmable register set in response to the signature verification of the at least one target function. In another example, a cryptographic signature of the secure interrupt handler code is calculated and compared with a signature stored in a secure programmable register in order to verify the signature of the secure interrupt handler code. In yet another example, a signature loaded into a secure programmable register during a secure boot process is accessed to verify the signature of the secure interrupt handler code.

In another example, a target function engine control value is updated to initiate a secure run-time target function launch operation in response to the calling function wanting to call the at least one target function. A target function signature-compare status value is then updated in response to verifying at least a signature of the at least one target function during run-time. Next, if the target function signature-compare status value indicates a signature compare failure, the at least one target function is prevented from being executed.

In one example, the device includes a secure programmable register set that stores data representing, on a per target function basis, at least a signature for each of plurality of target functions. Furthermore, in this example, the engine is operative to access one of the plurality of target function signatures in response to the calling function referencing target function ordinal information.

In another example the device includes memory, an engine, at least one secure programmable register in operative communication with the engine, and a processor in operative communication with both the engine and memory for executing the at least one target function if the engine allows execution of the at least one target function. In this example, the processor may be a CPU, a GPU, or any other suitable processor. In this example, the engine is further operative to generate an interrupt to the processor during run-time to launch the secure interrupt handler if the signature of the secure interrupt handler code successfully verifies. In yet another example, the processor uses the secure interrupt handler code to call the at least one target function.

In one example, the engine is operative to prevent the at least one target function from executing by asserting a processor interrupt, asserting an external control signal, or by any other suitable method.

In another example, the device includes a secure programmable register set that stores at least a target function signature-compare status value, a target function-state status value, a target function-completion notification value, a target function signature-fail notification value, or a target function engine control value. In this example, each secure programmable register within the secure programmable register set is configurable to be secure via an access mode value. In yet another example, the secure programmable register set also stores several values loaded during a secure boot process including at least a target function load address value, a target function length value, a target function cryptographic signature method value, a target function cryptographic signature length value, or a target function cryptographic signature value.

In another example, the secure programmable register may be a managed secure register. In another example, the device employs a signature verification engine to verify the signatures of the secure interrupt handler code and the at least one target function during run-time.

Among other advantages, the disclosed method, apparatus, and device provide authentication of a set of target functions at run-time, managed execution of a set of target functions, a system for passing parameters to and from target functions, notification of completion status after calling target functions, and programmable completion status events. Other advantages will be recognized by those of ordinary skill in the art.

The present disclosure also provides a method and accompanying apparatus and device for protecting against programming attacks and/or data corruption by computer viruses, malicious code, or other types of corruption. In one example of the method, signature verification policy information that identifies a plurality of policies associated with a plurality of target memory segments is programmed during a secure boot process. The programmed signature verification policy information associated with each of the plurality of target memory segments is then evaluated during run-time. Signature verification is then repeatedly performed, during run-time, on each of the plurality of target memory segments based on the programmed signature verification policy information associated with each target memory segment.

In another example of the method, the programmed signature verification policy information comprises programmed values that identify when signature verification on the at least one target memory segment is to be performed. In this example, evaluating the stored programmed signature verification policy information comprises accessing the programmed signature verification policy information prior to signature verification.

In yet another example of the method, performing signature verification comprises calculating a cryptographic signature over each target memory segment and comparing the calculated cryptographic signature with a correlating programmed target memory segment signature value stored in a programmable register set.

In one example of the method, the programmed values include at least one of an on-demand signature verification value of the at least one target memory segment, a time-interval signature verification value of the at least one target memory segment, or an event-based signature verification value of the at least one target memory segment. In another example of the method, the programmed signature verification policy information comprises post-signature action identification data.

In one example of an apparatus embodied in an integrated circuit, the integrated circuit includes a programmable register set operatively connected to at least one signature verification engine (SVE). In this example, the signature verification engine is operative to evaluate stored programmable signature verification policy information associated with at least one target memory segment during run-time. The signature verification engine is also operative to perform, during run-time, signature verification on the at least one target memory segment based on the stored programmable signature verification policy information to protect against programming attacks and/or data corruption. Furthermore, in this example, the programmable register set is operative to store programmable signature verification policy information associated with the at least one target memory segment.

In another example of an apparatus, the programmable signature verification policy information comprises programmable values that identify when signature verification on the at least one target memory segment is to be performed. In this example, evaluating stored programmable signature verification policy information comprises accessing the programmable signature verification policy information prior to signature verification.

In yet another example of an apparatus, performing signature verification comprises calculating a cryptographic signature over the at least one target memory segment and comparing the calculated cryptographic signature with a correlating programmable target memory segment signature value stored in the programmable register set.

In another example of an apparatus, the programmable values include at least one of an on-demand signature verification value of the at least one target memory segment, a time-interval signature verification value of the at least one target memory segment, or an event-based signature verification value of the at least one target memory segment.

In another example of an apparatus, the programmable signature verification policy information comprises post-signature verification action identification.

In one example of the device, the device includes memory containing a plurality of target memory segments, a programmable register set, a plurality of signature verification engines, and a CPU. The CPU is in operative communication with the plurality of signature verification engines, memory, and the programmable register set. Each signature verification engine is operatively connected to the programmable register set and memory. The programmable register set is operative to store programmable signature verification policy information associated with the plurality of target memory segments. The plurality of signature verification engines are operative to verify signatures associated with separate target memory segments concurrently. Each signature verification engine is operative to evaluate stored programmable signature verification policy information associated with a target memory segment during run-time and repeatedly perform, also during run-time, signature verification on a target memory segment based on the stored programmable signature verification policy information. In this example, the CPU is operative to program programmable signature verification policy information into the programmable register set during a secure boot process.

In another example of the device, the programmable signature verification policy information comprises programmable values that identify when signature verification on each target memory segment is to be performed. In this example, evaluating the programmable signature verification policy information comprises accessing the programmable signature verification policy information prior to signature verification.

In yet another example of the device, performing signature verification comprises calculating a cryptographic signature over each target memory segment and comparing the calculated cryptographic signature with a correlating programmable target memory segment signature value stored in the programmable register set.

In another example of the device, the programmable values include at least one of an on-demand signature verification value a target memory segment, a time-interval signature verification value of a target memory segment, or an event-based signature verification value of a target memory segment. In another example of the device, the programmable signature verification policy information comprises post-signature verification action identification data.

In one example, the post-signature verification action identification data includes at least one of an assert hardware interrupt on signature error value, an assert hardware control line on signature error value, a clear memory range on signature error value, a stop signature verification engine on signature error value, an assert hardware interrupt on signature match value, or an assert hardware control line on signature match value.

Among other advantages, the disclosed method, apparatus, and device provide authentication of target memory segments, including, for example, software code and/or data constants, during run-time. Other advantageous features include: the ability to interface to busses, switches, or interconnects within a system to access memory devices for READ/WRITE; a programmable register set for CONTROL and STATUS; the ability to be replicated as multiple core blocks to operate on multiple memory segments simultaneously; the ability to operate on memory segments at specific programmable time intervals; the ability to assert interrupts to the CPU after signature comparison; and the ability to assert trigger signals via control lines connected to other system logic. Other advantages will be recognized by those of ordinary skill in the art.

The following description of the embodiments is merely exemplary in nature and is in no way intended to limit the disclosure, its application, or uses. As used herein, the terms "integrated circuit," "engine," "signature verification engine," "policy-based secure register manager logic," and/or "device" can include, as known in the art, electronic circuits, one or more processors (e.g., shared, dedicated, or group of processors such as but not limited to microprocessors, DSPs, or central processing units) and memory, that execute one or more software or firmware programs, combinational logic circuits, an ASIC, and/or other suitable components that provide the described functionality. Additionally, as known in the art, the term "signal" may refer to one or more analog or digital signals. Furthermore, as will be appreciated by those of ordinary skill in the art, the layout of an "integrated circuit," "engine," "signature verification engine," "policy-based secure register manager logic," and/or "device" can be described in a hardware description language such as Verilog™, VHDL, and/or other suitable hardware description languages.

Referring now to FIG. 1, an exemplary functional block diagram of a device 100 that provides secure target function launch, such as devices that may employ DRM systems, or any other suitable devices. The device includes memory 102, an integrated circuit 104, control logic 120, and a CPU 116.

The memory 102 is operative to store a calling function 112, at least one target function 114, a parameter data structure 118 (i.e., parameters), and secure interrupt handler code 110 (i.e., secure interrupt handler/indirect function launch interrupt handler/indirect function call handler/indirect function handler). The memory may be RAM, ROM, or any other suitable digital storage medium. The integrated circuit 104, such as a graphics processing unit (GPU) includes an engine 108 (i.e., a hardened function engine/HFE), a signature verification engine 122 (SVE) within the engine 108, and a secure programmable register set 106 (i.e., HFE programmable registers) having at least one secure programmable register 107 (SPR) therein.

The engine 108 is depicted as being in one-way communication with control logic 120 and CPU 116 over bus lines 124 and 126, respectively. The control logic 120 may be any suitable logic sought to be controlled by the engine 108. The engine 108 is operative to transmit an external trigger signal to the control logic 120 over bus line 124 and a CPU interrupt signal to the CPU 116 over bus line 126. The CPU 116 is in two-way communication with memory 102 over the data memory bus 136, which may be accessed by the engine over bus line 140.

Dashed line 134 represents programmable control values and status values being communicated between the calling function 112 and the secure programmable register set 106. For example, the programmable control values may include target function engine control values 348 as discussed below and shown in FIG. 4. As such, a secure run-time target function launch operation may be initiated in response to the calling function 112 wanting to call a target function 114 by updating a target function engine control value 348. The status values may include, for example, target function-state status values 342 as discussed below and shown in FIG. 4. Dashed line 130 represents, for example, target function signature record set values being communicated between the secure interrupt handler code 110 and the secure programmable register set 106. For example, the target function signature record set values could include the values stored in the target function $F_1$ signature record set 302 described below and shown in FIG. 3. As such, the secure interrupt handle code 110 is capable of identifying at least one target function 114 from values stored within the secure programmable register set 106 in response to the signature verification of the at least one target function 114.

Dashed line 132 represents data being communicated between the secure interrupt handler code 110 and a target function 114. Dashed line 138 represents parameter data being communicated between a target function 114 and a parameter data structure 118 that stores parameter data. For example, each target function 114 would understand how to parse the parameter data structure 118 when the target function 114 is called, and fill in return status information in the parameter data structure 118. This mechanism allows unlimited function parameter arrangements. Dashed line 128 represents parameter data being communicated between the calling function 112 and the parameter data structure 118. For example, a secure calling function 112 (composed of obfuscated code) uses the engine 108 to execute a target function 114 using function parameters stored in the parameter data structure 118 in a block of memory 102.

In operation, by using the engine 108, a set of target functions 114 loaded in run-time memory 102 may be hardened against attack and used by software programs as if they were implemented in silicon, providing security for critical functions such as DRM.

Figure 2:
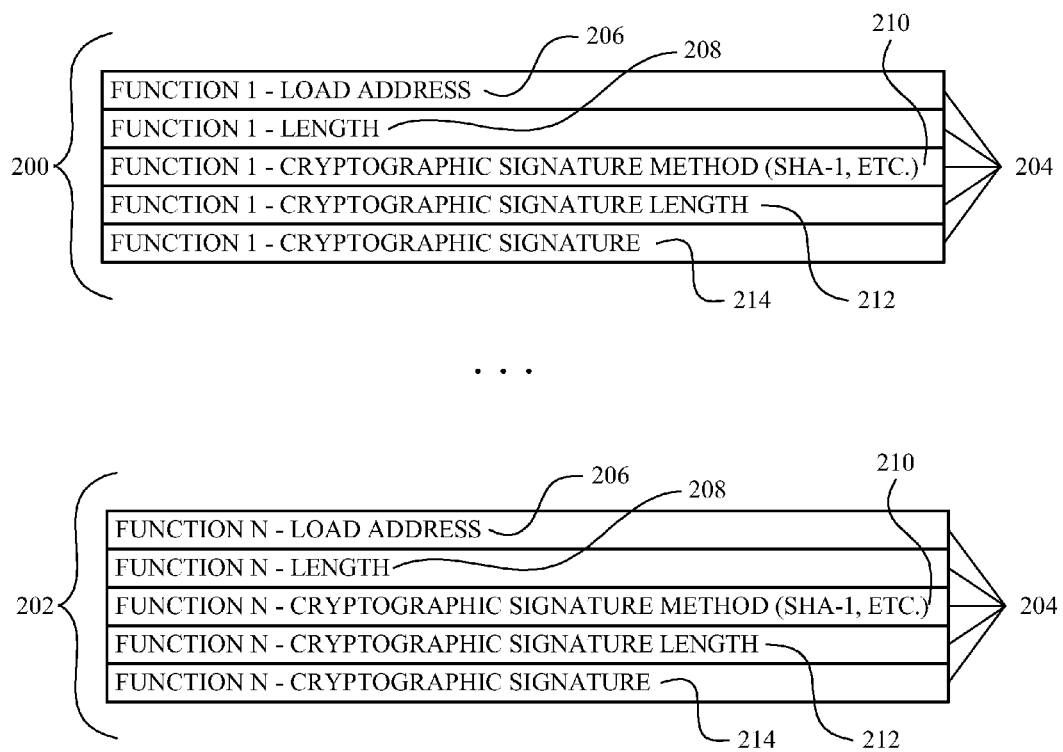
FIG. 2 is a representation of function signature record sets for Functions 1-N.

FIG. 2 is a representation of function signature record sets for Functions 1-N. Function 1 signature record set 200 includes, in this example, five secure programmable registers 204. Each secure programmable register 204 is operative to store data associated with function 1 such as a load address value 206, a function length value 208, a cryptographic signature method value 210, a cryptographic signature length value 212, and a cryptographic signature value 214. There may be as many function signature record sets as there are functions sought to be hardened/secured as represented by function N signature record set 202.

With respect to build and manufacturing details, the set of target functions (e.g., functions 1-N) to harden are identified when the software is built. For each target function 114, a cryptographic signature value 214 is calculated over the length of the function 208 using a selected cryptographic method 210 such as SHA-1. A function signature record set is created for each target function 114 in the set as shown in FIG. 2 and in an embodiment may be stored encrypted within secure boot code. One of the functions in the set of target functions is the secure interrupt handler code 110. Accordingly, a function signature record set is created for the secure interrupt handler code 110 as well, which may also be stored within secure boot code.

FIGS. 3-4 are a representation of a secure programmable register set 300 in accordance with one embodiment of the disclosure. The secure programmable register set 300 includes a target function signature record set for each target function 114, as well as a function signature record set for the secure interrupt handler code 110. For example, and as further discussed below, the function signature record set values 206-214 that are stored in secure boot ROM are programmed into the secure programmable register set 300 during a secure boot process. FIG. 3 shows target function signature record sets for target functions $F_1$-$F_4$ (target function signature record sets for target function 2-3 have been omitted for simplicity). Thus, these target function signature record sets (e.g., target function $F_1$ signature record set 302) contain registers (e.g., registers 304-310) corresponding to the registers (e.g., 206-214) contained in the function signature record sets (e.g., function 1 signature record set 200).

Target function $F_1$ signature record set 302 depicts secure programmable registers such as the $F_1$ pointer register 304, the $F_1$ size register 306, the $F_1$ signature type register 308, and the $F_1$ signature register 310. These $F_1$ signature registers 304-310 store values corresponding to, for example, the load address register value 206, function length value 208, cryptographic signature method value 210, and cryptographic signature value 214, respectively, which are programmed into the $F_1$ signature record set 302 of the secure programmable register set 300 during the secure boot process. Accordingly, although not shown in FIG. 3, there is a $F_1$ signature size register containing a value corresponding to the cryptographic signature length value 212 shown in FIG. 2. As such, and as further discussed below, FIG. 3 shows a secure programmable register set 300 comprising data representing, on a per target function basis, at least a signature (e.g., $F_1$ signature register 310) of each of a plurality of target functions (e.g., target functions $F_1$-$F_4$), wherein the engine 108 is operative to access one of the plurality of target function signatures in response to target function ordinal information being referenced by the calling function 112.

The $F_1$ pointer register 304 includes a value representing $F_1$'s run-time memory address. The $F_1$ size register 306 includes a value representing $F_1$'s length. The $F_1$ signature type register 308 includes a value representing the cryptographic signature method applied to $F_1$'s signature, such as 0x1=SHA-1, 0x2=SHA-256, or any other suitable cryptographic signature method. The $F_1$ signature size register (not shown) includes a value representing $F_1$'s cryptographic signature length. Finally, the $F_1$ signature register 310 includes a value representing $F_1$'s cryptographic signature.

Similarly, the $F_4$ signature record set 312 includes secure programmable registers such as the $F_4$ pointer register 314, the $F_4$ size register 316, the $F_4$ signature type register 318, and the $F_4$ signature register 320. The $F_4$ registers 314-320 include values analogous to those described above with respect to the $F_1$ registers. Again, although not shown in FIG. 3, the $F_4$ signature record set 312 also includes a $F_4$ signature size register containing a value representing $F_4$'s cryptographic signature length. As such, the secure programmable register set 300 stores at least the following values loaded during a secure boot process: a target function load address value (e.g., $F_1$ pointer register 304 value); a target function length value (e.g., $F_1$ size register 306 value); a target function cryptographic signature method value (e.g., $F_1$ signature type register 308 value); a target function cryptographic signature length value (not shown); and a target function cryptographic signature value (e.g., $F_1$ signature register 310 value).

As further shown in FIGS. 3-4, the secure programmable register set 300 also includes a target function signature-compare status register 322, a target function-state status register 324, a target function-completion notification register 326, a target function signature-fail notification register 328, and a target function engine control (i.e., HFE control) register 330.

The target function signature-compare status register 322 includes function signature-compare status values 340 representing whether a signature comparison operation was a success or failure for each target function 114. As such, the target function signature-compare status values may be updated in response to verifying, during run-time, at least a signature of the at least one target function 114, as further described below and shown in block 702 of FIG. 7. The target function-state status register 324 includes function-state status values 342 representing whether a target function is running or halted, as controlled by the secure interrupt handler code 110. The target function-completion notification register 326 is a secure programmable register that includes function-completion notification values 344 representing whether the engine 108 should assert a CPU interrupt, an external trigger signal, or, if desired, do nothing upon target function completion.

Similarly, the target function signature-fail notification register 328 is a secure programmable register that includes signature-fail notification values 346 representing whether the engine 108 should assert a CPU interrupt, an external trigger signal, or, if desired, do nothing upon receiving a target function signature fail notification. The engine 108 uses the target function signature-fail notification register 328 to prevent the at least one target function 114 from being executed in response to the target function signature-compare status value 340 indicating a signature compare failure. As such, the engine 108 is operative to prevent the at least one target function 114 from being executed by updating the value(s) 340 in the target function signature-compare status register 322 and asserting, for example, a processor interrupt or external control signal (determined based on the value(s) 346 programmed into the target function signature-fail notification register 328). As a result, the CPU 116 and/or control logic 120 prevent the target function 114 from being executed because they are notified of a target function signature fail.

Finally, the target function engine control register 330 includes engine control values 348 representing whether a particular target function 114 should be launched or halted. As such, a secure run-time target function launch operation may be initiated in response to the calling function 112 wanting to call a target function 114 by updating a target function engine control value 348.

As shown in FIG. 4, each register within the secure programmable register set 300 further includes a register size value 332 representing the register size in bits and a register access mode value 334. The register access mode value 334 represents an access mode associated with a register such as read, write, write/read, or invisible after write. A register having an invisible after write access mode is only visible for write one-time after power-on during a secure boot process, only visible internally for read (e.g., by the engine 108, SVE 122, etc.) during interrupt processing to the secure interrupt handler code, and is invisible otherwise externally. These invisible after write registers are one example of managed secure registers. In one example, secure register access is variable according to the settings of a programmable access policy register that stores programmable policy data as further described below. Accordingly, FIGS. 3-4 depict a secure programmable register set 300, wherein each secure programmable register 107 within the secure programmable register set 300 is configurable to be secure via an access mode value 334, and wherein the secure programmable register set 300 stores at least: a target function signature-compare status value 340; a target function-state status value 342; a target function-completion notification value 344; a target function signature-fail notification value 346; and a target function engine control value 348.

Programming the engine at power-on is accomplished as follows. The function signature record sets shown in FIG. 2 are stored in a secure boot ROM (and may be encrypted using known encryption techniques) and during the secure boot process, the values are programmed into the secure programmable register set 300 shown in FIGS. 3-4. The engine 108 contains an ordinal set of write-once software-fused registers (e.g., registers 304-310) to contain the target function signature record fields (e.g., $F_1$ signature record set 302). Software fused registers can only be set one-time (write-once) after power-on. After fusing, the target function signature record registers (e.g., registers 304-310) cannot be read or written by malicious software and are essentially invisible from read/write access.

The following steps are performed to set up engine 108 for use at run-time, typically during a secure boot process using trusted code: load the target function sets (e.g., Function 1 signature record set 200) into run-time memory 102; load secure interrupt handler code 110 into run-time memory 102 at the address expected by the CPU 116 for this interrupt handler (i.e., could be an non-maskable interrupt vector for example); program the secure programmable register set 300 for each target function's run-time memory address (e.g., $F_1$ pointer register 304 value), length (e.g., $F_1$ size register 306 value), cryptographic signature method (e.g., $F_1$ signature type register 308 value), cryptographic signature length (e.g., $F_1$ signature length register value—not shown in FIG. 3), and cryptographic signature (e.g., $F_1$ signature register 310 value); program the secure programmable register set 300 for the secure interrupt handler code's run-time memory address, function length, cryptographic signature method, cryptographic signature length, and cryptographic signature (not shown in FIG. 3); signature verification engine 122 is programmed to perform various actions after the signature is checked to indicate completion status such as raise interrupts, assert control lines, clear memory, etc.; and finally, the engine 108 is ready to be armed and execute the target functions.

To operate the engine 108 at run-time, the calling function 112 initializes a bit in the target function engine control register 330. For example, when Bit 0 in the target function engine control register 330 is initialized, a target function engine control value 348 is set to launch target function $F_1$. Each target function 114 in the set is then referenced at run-time and called as an ordinal number in the range [1 . . . N], where N is the number of target functions supported.

Figure 5:
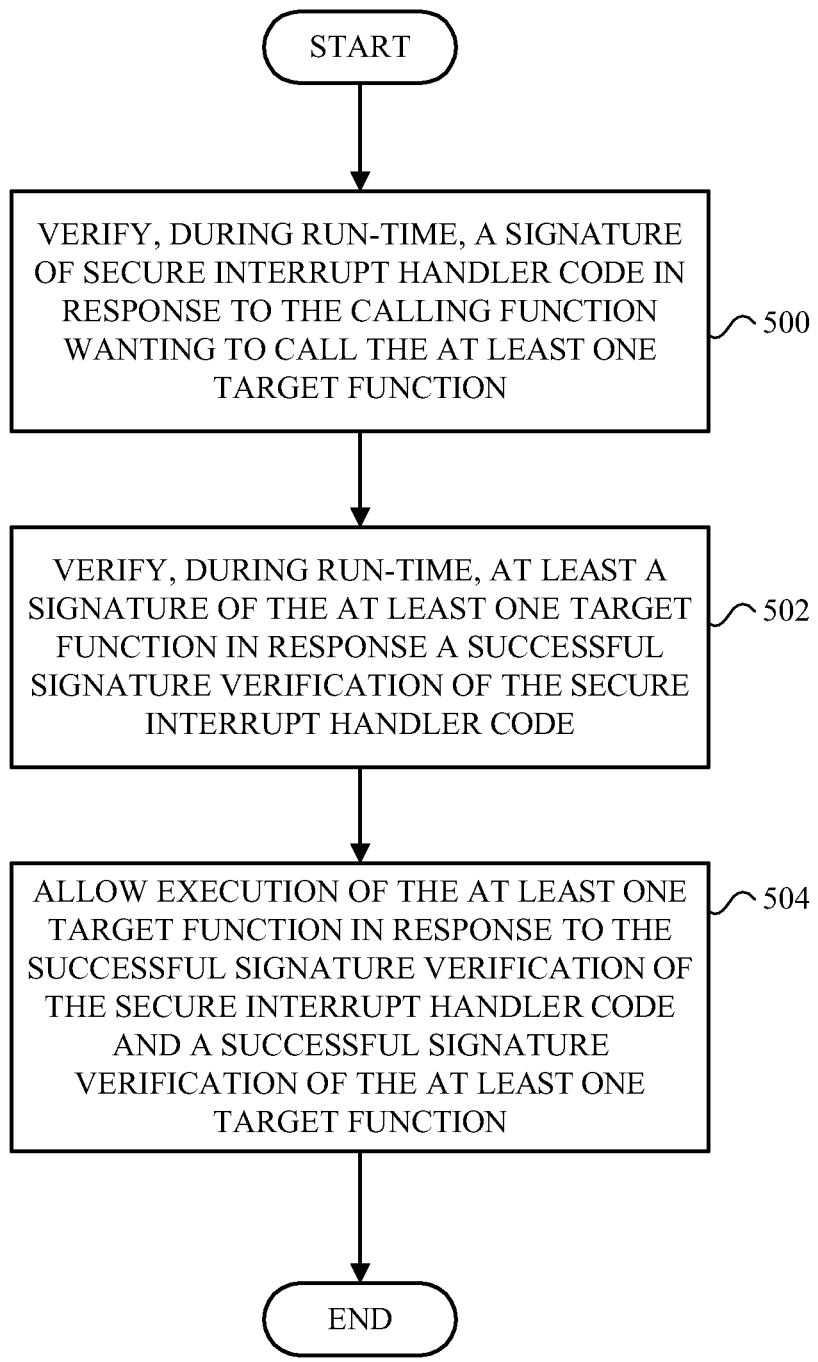
FIG. 5 is a flow chart illustrating a method for providing security between a calling function and a target function in accordance with one embodiment of the disclosure.
Figure 6:
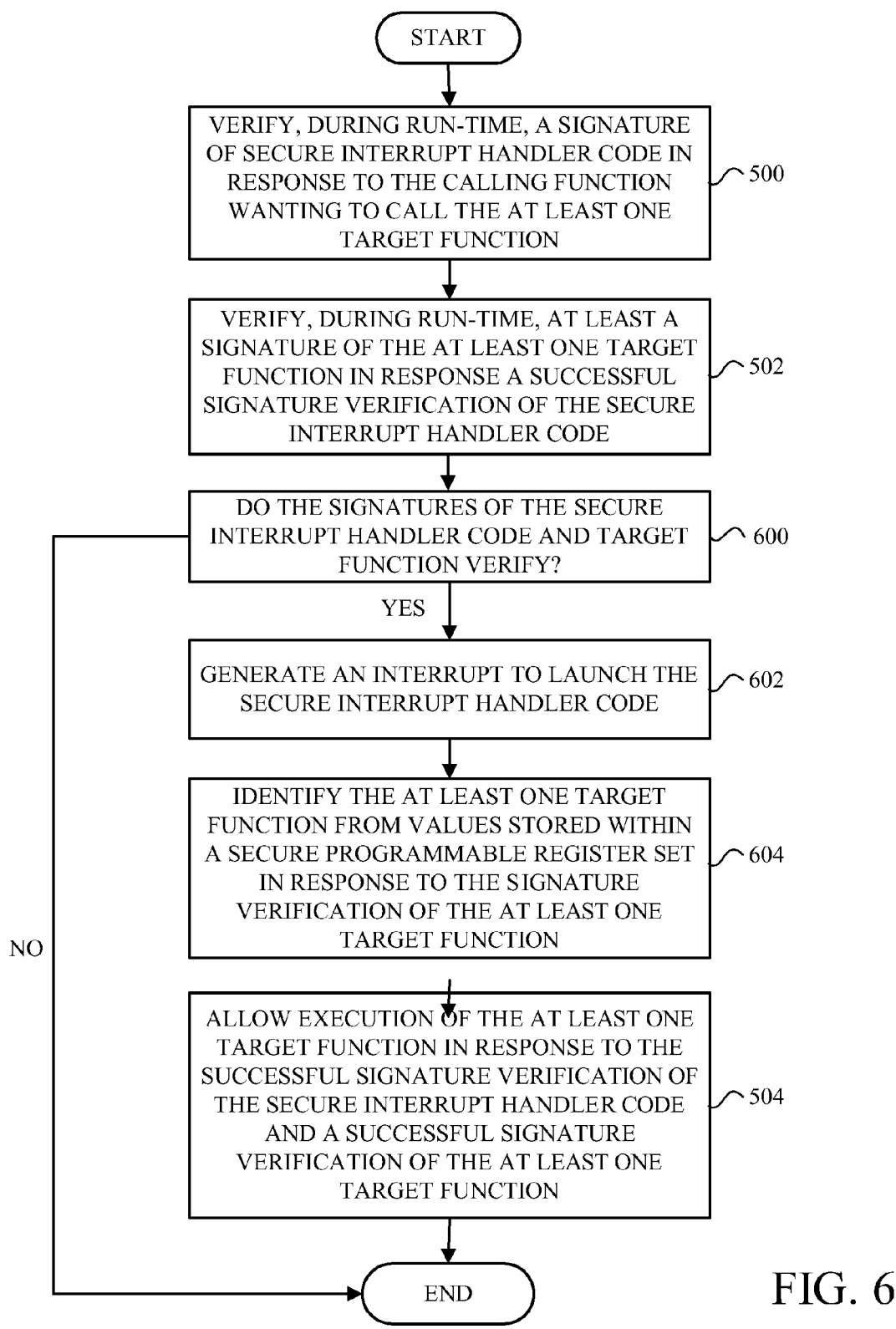
FIG. 6 is a flowchart illustrating another method for providing security between a calling function and a target function in accordance with one embodiment of the disclosure.
Figure 7:
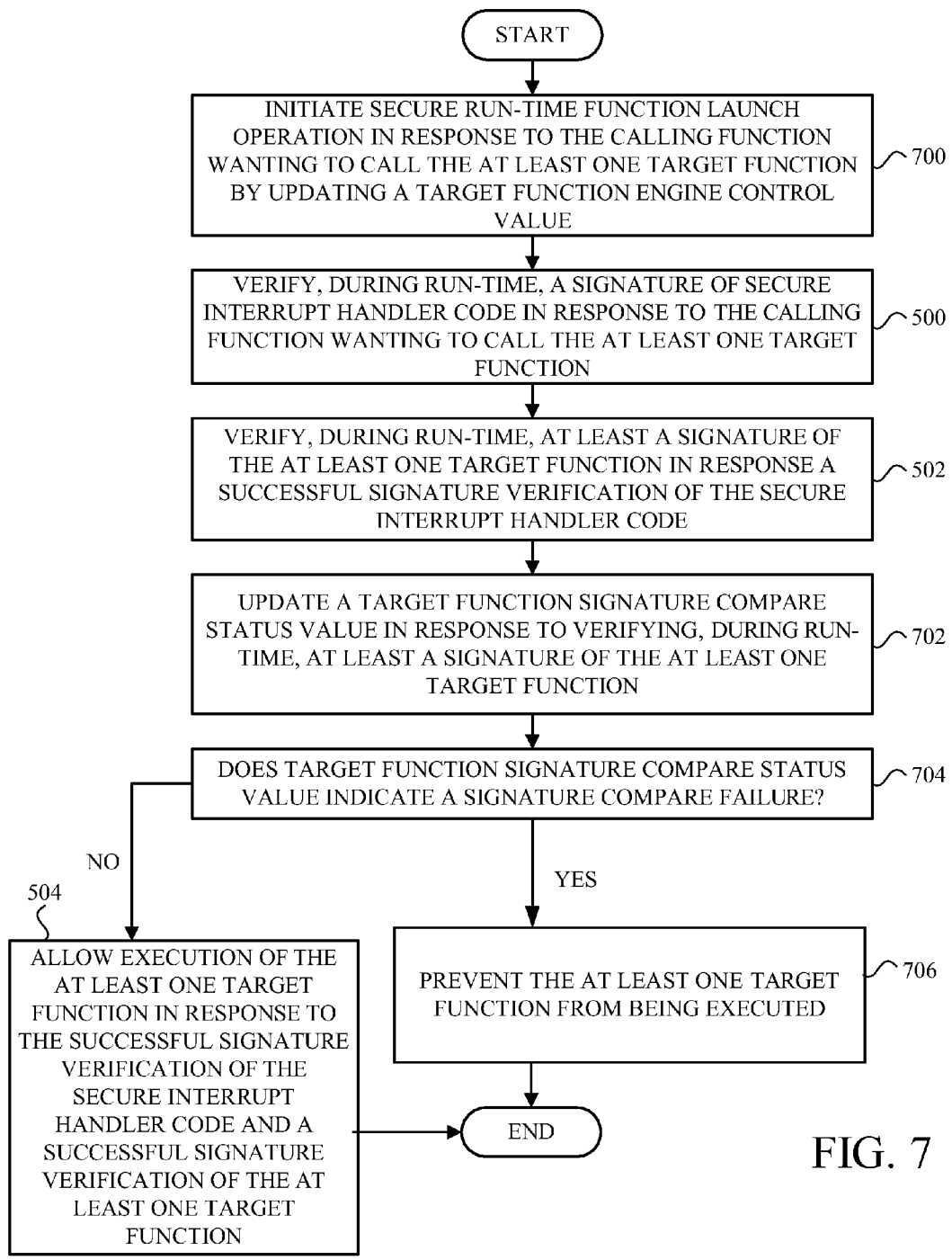
FIG. 7 is a flowchart illustrating yet another method for providing security between a calling function and a target function in accordance with one embodiment of the disclosure.

FIGS. 5-7 illustrate several embodiments of a method for providing security between a calling function 112 and a target function 114. FIG. 5 is a flow chart illustrating a method for providing security between a calling function 112 and a target function 114 in accordance with one embodiment of the disclosure. At block 500, a signature of secure interrupt handler code 110 is verified during run-time in response to the calling function 112 wanting to call at least one target function 114. For example, the calling function 112 initializes a bit in the target function engine control register 330 to indicate that it wants to call a target function 114 and the engine 108 verifies the signature of the secure interrupt handler code (CPU vector handler) 110 at run-time using its signature verification engine (SVE) 122. The SVE 122 verifies the signature of the secure interrupt handler code 110 by calculating a cryptographic signature over the secure interrupt handler's memory range and comparing the calculated cryptographic signature with a signature stored in a secure programmable register 300. For example, the SVE 122 may verify the signature of the secure interrupt handler code by accessing, from a secure programmable register 107, a signature loaded during a secure boot process.

At block 502, at least a signature of the at least one target function 114 is verified during run-time in response to a successful signature verification of the secure interrupt handler code 110. For example, assuming the signature verification of the secure interrupt handler code 110 was successful, the engine 108 uses its SVE 122 to verify the signature of the at least one target function 114 by reading the at least one target function memory, calculating a cryptographic signature over the at least one target function's memory range, and comparing the calculated cryptographic signature with a signature stored in a secure programmable register 300.

Finally, at block 504, execution of the at least one target function 114 is allowed in response to the successful signature verification of the secure interrupt handler code 110 and a successful signature verification of the at least one target function 114. For example, if the target function 114 is authenticated, the engine 108 asserts the chosen interrupt line and the CPU 116 will vector to the secure interrupt handler code 110 to allow execution of the target function 114.

FIG. 6 is a flow chart illustrating a method for providing security between a calling function 112 and a target function 114 in accordance with another embodiment of the disclosure. At blocks 500 and 502, the signatures of the secure interrupt handler code 110 and at least one target function 114 are verified as discussed above. At block 600, a determination is made as to whether the signatures of the secure interrupt handler code 110 and target function 114 verify. The engine's SVE 122 makes this determination as described above. If the signature of the secure interrupt handler code 110 and the signature of the at least one target function 114 verify, an interrupt is generated to launch the secure interrupt handler code 110 as shown in block 602. For example, when the CPU interrupt is generated (which could be a non-maskable interrupt), the CPU 116 holds the interrupt line ACTIVE until the secure interrupt handler code completes while the engine 108 monitors the interrupt line for the INACTIVE state. The CPU 116 then vectors to the secure interrupt handler code 110 (indirect function handler) and uses the secure interrupt handler code to call the at least one target function. Accordingly, the secure interrupt handler code 110 is designed to launch the target functions 114 when the engine 108 asserts a chosen CPU interrupt line such as non-maskable interrupt. Furthermore, the secure interrupt handler code 110 is always authenticated by the engine 108 prior to asserting the CPU interrupt.

If the signatures of the secure interrupt handler code and the at least one target function do not verify at block 600, the process ends. Assuming the signatures do verify, the process proceeds to block 604 where the at least one target function 114 is identified from values stored within a secure programmable register set 300 in response to the signature verification of the at least one target function 114. For example, the secure interrupt handler code 110 reads a dedicated read-only secure programmable register 107 to determine the selected target function 114 address to call, and this register is only visible while the chosen CPU interrupt line is active, to assure that the target function address is only visible while the chosen interrupt line is asserted and the secure interrupt handler code 110 is executing. The secure interrupt handler code 110 then reads the address of the target function 114 and calls the target function 114.

Finally, at block 504 of FIG. 6, execution of the at least one target function 114 is allowed in response to the successful signature verification of the secure interrupt handler code 110 and a successful signature verification of the at least one target function 114, as described above. Accordingly, a processor (e.g., the CPU 116) in operative communication with the engine 108 and memory 102 is operative to execute the at least one target function 114 being called by the secure interrupt handler code 110 in response to the engine 108 allowing execution of the at least one target function 114.

FIG. 7 is a flow chart illustrating a method for providing security between a calling function 112 and a target function 114 in accordance with another embodiment of the disclosure. At block 700, a secure run-time function launch operation is initiated in response to the calling function 112 wanting to call the at least one target function 114 by updating a target function engine control value 348. For example, and as discussed above, the target function engine control register 330 includes engine control values 348 representing whether a particular target function 114 should be launched or halted. If, for example, the calling function 112 wants to call target function $F_1$, it may initiate a secure run-time function launch operation of target function $F_1$ by initializing Bit 0 (representing one engine control value 348) in the target function engine control register 330.

At block 500 of FIG. 7, a signature of secure interrupt handler code 110 is verified during run-time in response to the calling function 112 wanting to call at least one target function 114, as described above. At block 502, at least a signature of the at least one target function 114 is verified during run-time in response to a successful signature verification of the secure interrupt handler code 110, as described above. At block 702, a target function signature-compare status value 340 is updated in response to verifying, during run-time, at least a signature of the at least one target function 114. For example, the target function signature-compare status register 322 includes target function signature-compare status values 340 representing whether a signature comparison operation performed by the engine's SVE 122 was a success or failure for each target function 114.

At block 704, a determination is made as to whether the target function signature-compare status value 340 indicates a signature compare failure. This is accomplished, for example, by the engine 108 reading its internal signature-compare status register values 340. If the target function signature-compare status value 340 does not indicate a signature compare failure for the at least one target function 114, the process proceeds to block 504 and execution of the at least one target function 114 is allowed in response to the successful signature verification of the secure interrupt handler code 110 and a successful signature verification of the at least one target function 114, as described above. If the target function signature-compare status value 340 does indicate a signature compare failure for the at least one target function 114, the process proceeds to block 706 and the at least one target function 114 is prevented from being executed. For example, if signature authentication fails, the engine 108 can be programmed to assert a CPU interrupt or external trigger control signal to prevent the target function from executing, as described above. Furthermore, the engine 108 can be programmed to reflect appropriate status in the secure programmable register set 300.

Assuming that the at least one target function 114 is allowed to execute, the calling program 112 (i.e., calling function) loads parameters for the target function 114 into a data structure parameter block 118 (i.e., parameter data structure) at a location known to the target function 114, as shown by dashed line 128 in FIG. 1. Subsequently, the target function 114 reads and writes parameters and status into the parameter block, as shown by dashed line 138 in FIG. 1. The parameter block 118 could also be signed and encrypted, if the calling function 112 and target function 114 are designed accordingly. When the target function 114 is complete and the engine 108 signals completion, the calling function 112 may read the results from the parameter block 118.

Once programmed to execute an ordinal function, the engine 108 performs the following actions: engine 108 locks its register set 106 and cannot be re-programmed until finished with the current operation—this is a security feature; secure interrupt handler code 110 (CPU interrupt vector handler) signature is verified, as shown in FIGS. 5-7 and described above; target function 114 signature is verified, as shown in FIGS. 5-7 and described above; CPU interrupt is generated (which could be a non-maskable interrupt), as shown in FIG. 6, and the CPU 116 holds the interrupt line ACTIVE until the secure interrupt handler code 110 completes while the engine 108 monitors the interrupt line for the INACTIVE state, as described above; CPU 116 vectors to secure interrupt handler code 110 (indirect function handler), as described above with respect to FIG. 5; secure interrupt handler code 110 reads secure programmable engine registers 107 to identify the armed target function that has been verified, as shown in FIG. 6 and described above, and then reads the address of the target function 114 and calls the target function 114, as described above with respect to FIG. 6; target function 114 executes, as described above with respect to FIG. 6; target function 114 parses parameter data structure 118; target function 114 returns control to secure interrupt handler code 110; secure interrupt handler code 110 completes and releases control to CPU 116; and CPU 116 sets the interrupt line to INACTIVE, and the engine 108 detects the interrupt completion signal, signals completion via interrupt or trigger signal if desired, and sets engine status registers (e.g., target function-state status register 324) to reflect completion.

After programming the engine 108 to call a function 114, the calling function 112 may check status as follows: poll or subsequently read the engine status register for completion status (e.g., by checking target function-state status register value 342) and wait for engine hardware notification of completion via interrupt or external trigger signal into other control logic 120, as illustrated by target function-completion notification values 344 in target function-completion notification register 326.

Figure 8:
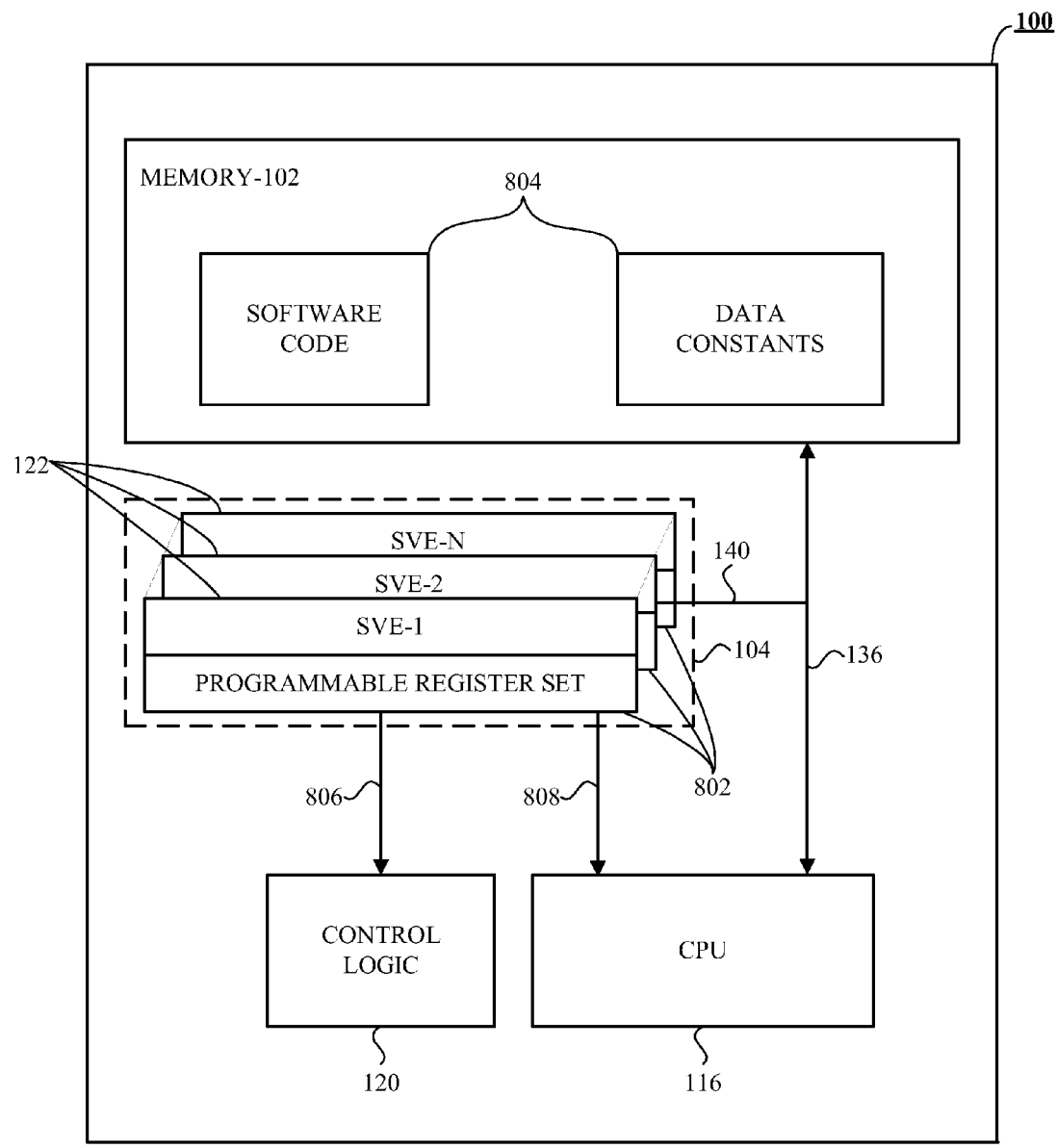
FIG. 8 is a block diagram generally depicting one example of a device for protecting against programming attacks and/or data corruption in accordance with one embodiment of the disclosure.

FIG. 8 is an exemplary functional block diagram generally depicting one example of a device 100 for protecting against programming attacks and/or data corruption, such as devices that may employ DRM systems, or any other suitable devices. As with the device 100 described above with respect to FIG. 1, this device 100 also includes memory 102, an integrated circuit 104, control logic 120, and a CPU 116.

The memory 102 is operative to store at least one target memory segment 804, such as, for example, software code and/or data constants. The integrated circuit 104 includes at least one signature verification engine 122 (SVE) and a programmable register set 802 (i.e., programmable registers) operatively connected to the at least one signature verification engine 122. The programmable register set 802 is operative to store programmable signature verification policy information 1026 associated with at least one target memory segment 804, as further discussed below with respect to FIGS. 10-12.

The at least one signature verification engine 122 and programmable register set 802 are depicted as being in one-way communication with control logic 120 and CPU 116 over bus lines 806 and 808, respectively. The control logic 120 may be any suitable logic sought to be controlled by the at least one signature verification engine 122. The at least one signature verification engine 122 is operative to transmit an external trigger signal to the control logic 120 over bus line 806 and a CPU interrupt signal to the CPU 116 over bus line 808. The CPU 116 is in two-way communication with memory 102 over the data memory bus 136, which may be accessed by the at least one signature verification engine 122 over bus line 140. As shown in FIG. 8 and further described below, in one embodiment, the device includes a plurality of signature verification engines 122 (e.g., SVE-1-SVE-N) operative to verify signatures associated with separate target memory segments (e.g., software code target memory segment 804 and data constants target memory segment 804) concurrently. In this embodiment, the CPU 116 is in operative communication with the plurality of signature verification engines 122, memory 102, and programmable register set 802.

As an overview, the at least one signature verification engine 122 is a programmable core block which calculates a cryptographic signature over a target memory segment 804 (see actual signature result register 1008), compares the calculated signature (see signature verification status information 1030 BIT 2) with a known good signature of the memory segment (see expected signature result register 1006), and performs actions in response to the signature comparison (see BITS 5-10 within the programmable signature verification policy information 1026 of target memory segment control register 1012). As such, performing signature verification comprises calculating a cryptographic signature over at least one target memory segment 804 and comparing the calculated cryptographic signature with a correlating programmed target memory segment signature value stored in a programmable register set 802.

One example of a use-case for the signature verification engine 122 is to verify the integrity of software programs and data constants (e.g., target memory segments 804) in a memory system 102 at run-time, thereby protecting against malicious programming attacks and data corruption. For example, the signature verification engine 122 could be invoked prior to a function call or data access to authenticate the program (e.g., software code target memory segment 804) or data memory (e.g., data constants target memory segment 804) and establish trust.

The signature verification engine 122 provides run-time authentication of software (e.g., software code target memory segment 804) as opposed to load-time authentication of signed drivers during a secure boot process. Thus, the signature verification 122 engine is a run-time security feature, while a secure boot process may provide a load-time security feature for loading trusted code such as signed drivers. The signature verification engine may employ various types of cryptographic signatures including the SHA family, MD5, or other suitable methods. Generally, the recent variants of the SHA family are considered most secure.

To operate, the signature verification engine 122 must be configured with information as shown in FIG. 9 to describe the target memory segments 804 to be authenticated. FIG. 9 is a representation of a target memory segment signature record set 900. A target memory segment signature record set 900 will include the following values for any given target memory segment 804: a target memory segment address value 902; a target memory segment size value 904; a target memory segment cryptographic signature method value 906; a target memory segment cryptographic signature value 908; and a target memory segment cryptographic signature size value 910.

The target memory segment address value 902 describes the address of a target memory segment 804 and may contain information such as program code, or data constants such as cryptographic keys, serial numbers, constants or identification information. The target memory segment size value 904 describes the storage unit size of a target memory segment 804 in bytes, for example. The target memory segment cryptographic signature method value 906 describes the cryptographic signature method applied to a target memory segment 804 and could include methods such as, for example, SHA, MD5, or other suitable methods. The target memory segment cryptographic signature value 908 describes the cryptographic signature of a target memory segment 804 and may be of variable length depending on the cryptographic signature method chosen. Finally, the target memory segment cryptographic signature size value 910 describes the storage unit size of a target memory segment's cryptographic signature in bytes, for example.

Figure 12:
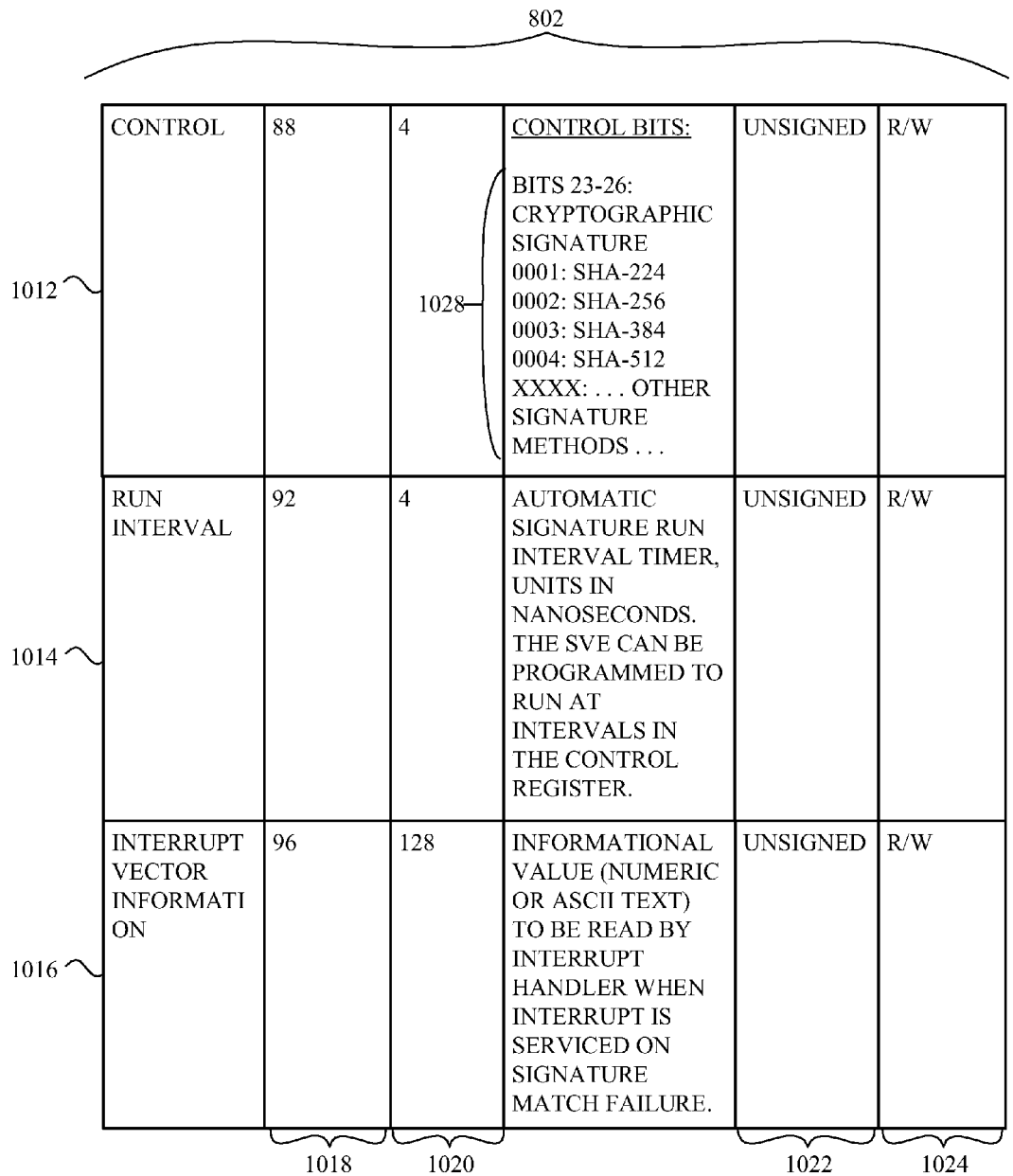

FIGS. 10-12 are a representation of a programmable register set register set 802 in accordance with one embodiment of the disclosure. As shown in FIGS. 10-12, the programmable register set register set 802 includes: a target memory segment start address register 1002; a target memory segment size register 1004; an expected signature result register 1006; an actual signature result register 1008; a SVE status register 1010; a SVE control register 1012; a run interval register 1014; and an interrupt vector information register 1016.

The target memory segment start address register 1002 includes a value describing the start address of a target memory segment. The target memory segment size register 1004 includes a value describing the size of a target memory segment. The expected signature result register 1006 includes a value describing the known good signature of a target memory segment. The actual signature result register 1008 includes a value describing the actual signature calculated by the signature verification engine 122. The SVE status register 1010 includes signature verification status information 1030 that indicates the operational status of the signature verification engine 122. For example, when BIT 2 of the signature verification status information 1030 is initialized, the SVE status register 1010 indicates that the signature verification engine 122 is verifying a target memory signature.

The SVE control register 1012 includes programmable signature verification policy information 1026. The programmable signature verification policy information 1026 identifies a plurality of policies associated with at least one target memory segment 804 and is programmed into the programmable register set 802 during a secure boot process. This is shown, for example, at block 1300 of FIG. 13 and further discussed below with respect to the SVE run-time set-up.

The programmable signature verification policy information 1026 may comprise, for example, programmable values that identify when signature verification on a target memory segment 804 is to be performed. This is shown, for example, in BITS 2-4 of the programmable signature verification policy information 1026. For example, BIT 2: RUN ONCE is a programmable value that, when set, demands that the signature verification engine 122 perform signature verification on a target memory segment 804. BIT 3: RUN AT INTERVALS is a programmable value that, when set, identifies that the signature verification engine 122 should perform signature verification on target memory segment 804 at various time intervals. BIT 4: RUN ON EXTERNAL TRIGGER SIGNAL is an event-based programmable value that, when set, identifies that the signature verification engine 122 should perform signature verification on a target memory segment 804 when a certain event, such as an external trigger signal, occurs. Accordingly, the programmed values that identify when signature verification on a target memory segment is to be performed include at least one of an on-demand signature verification value, a time-interval signature verification value, or an event-based signature verification value.

The programmable signature verification policy information 1026 may also comprise, for example, post-signature verification action identification data. This is shown, for example, in BITS 5-10 of the programmable signature verification policy information 1026. For example, BIT 5: ASSERT HW CONTROL LINE ON SIGNATURE ERROR is a programmable value that, when set, identifies the action that the signature verification engine 122 should take after verifying a target memory segment 804 signature and determining that there was a signature comparison error (i.e., non-match). Similarly, BITS 6-10 represent other programmable values that identify other possible post-signature verification actions that the signature verification engine 122 should take after verifying a target memory segment 804 signature. As such, the post-signature verification action identification data includes at least one of an assert hardware interrupt on signature error value, an assert hardware control line on signature error value, a clear memory range on signature error value, a stop signature verification engine on signature error value, an assert hardware interrupt on signature match value, or an assert hardware control line on signature match value. The SVE control register 1012 further includes cryptographic signature method information 1028 that contains control bits associated with different cryptographic signature methods.

The run interval register 1014 includes a value describing the automatic signature run interval timer with units in nanoseconds. The interrupt vector information register 1016 includes an informational value (numeric or ASCII text) to be read by secure interrupt handler code 110 when an interrupt is serviced on a signature match failure. Finally, as shown in FIGS. 10-12, each register within the programmable register set 802 includes an offset value 1018 (in bytes), a size value 1020 (in bytes), a signature value (i.e., signed or unsigned), and an access mode value 1024 (e.g., read/write or read-only).

Figure 13:
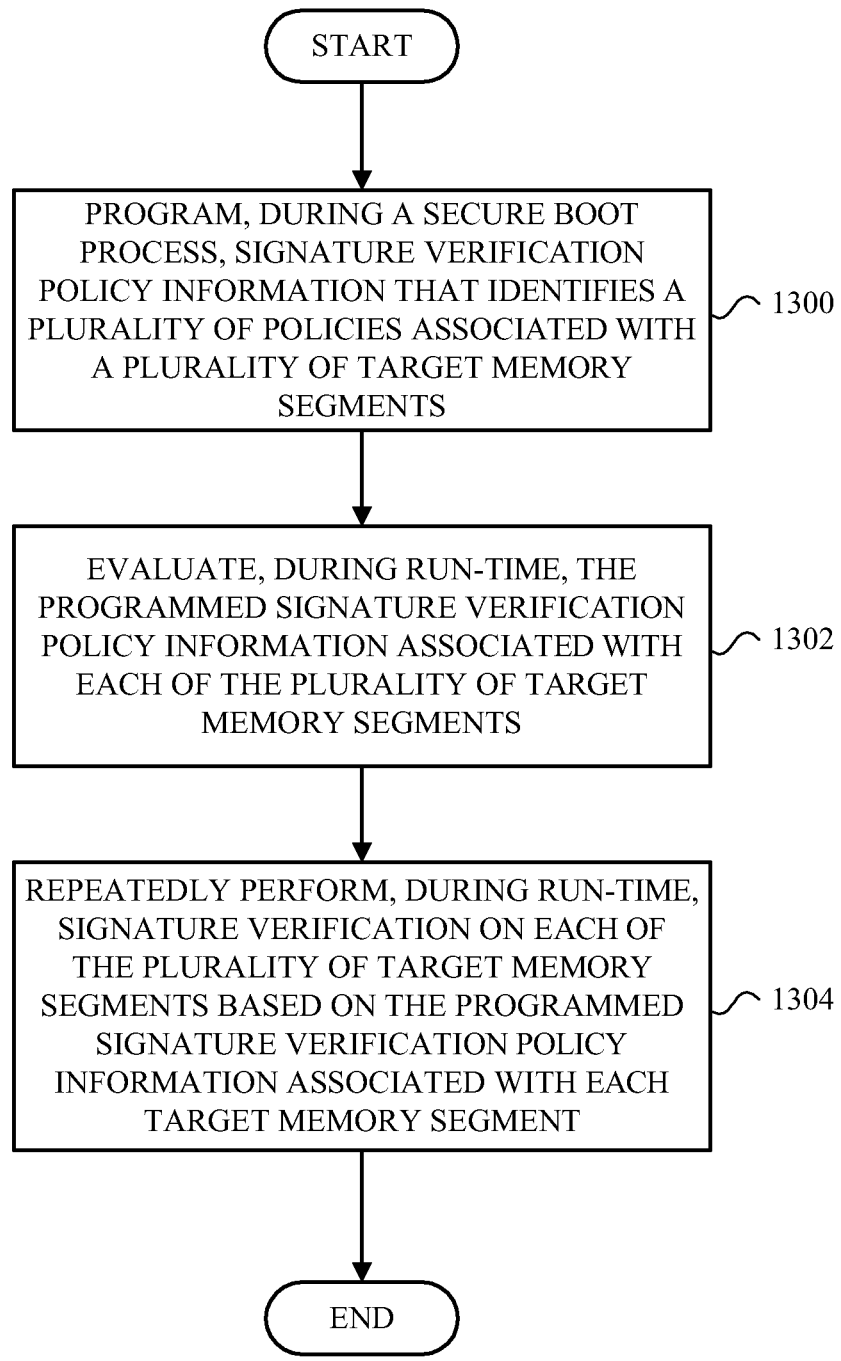
FIG. 13 is a flowchart illustrating a method for protecting against programming attacks and/or data corruption in accordance with one embodiment of the disclosure.

FIG. 13 is a flowchart illustrating a method for protecting against programming attacks and/or data corruption in accordance with one embodiment of the disclosure. At block 1300, signature verification policy information that identifies a plurality of policies associated with a plurality of target memory segments is programmed. For example, during a secure boot process using trusted code, the signature verification engine 122 is programmed as needed to check the signature of a target memory segment 804 at various time intervals or on demand. At this time, the signature verification engine 122 is also programmed to perform various actions after the signature is checked such as raise interrupts, assert control lines, clear memory, etc. These programmed signature verification policy information values 1026 are stored in the SVE control register 1012 as described above. At block 1302, the programmed signature verification policy information associated with each of the plurality of target memory segments is evaluated during run-time. For example, the signature verification engine 122 evaluates the programmed signature verification policy information 1026 during run-time to identify, for example, when signature verification on each target memory segment 804 is to be performed, as discussed above with respect to FIGS. 10-12. As such, evaluating the programmed signature verification policy information 1026 comprises accessing the programmed signature verification policy information 1026 prior to signature verification. Finally, at block 1304, signature verification is repeatedly performed on each of the plurality of target memory segments 804, during run-time, based on the programmed signature verification policy information 1026 associated with each target memory segment 804. For example, in an embodiment, multiple signature verification engines 122 may be implemented in system, allowing individual SVE blocks to verify separate memory regions concurrently, as illustrated in FIG. 8 and described above. Furthermore, each signature verification engine 122 may be programmed (see programmable register set 802) to automatically check a target memory segment at intervals, for example, every 100 microseconds.

The follow steps are performed to set up the signature verification engine 122 for use at run-time, typically during a secure boot process using trusted code: target memory segment 804 is loaded into run-time memory 102, as shown in FIG. 1; run-time memory address of target memory segment is programmed into signature verification engine 122, as shown in FIG. 9 and described above; size of target memory segment is programmed into signature verification engine 122, as shown in FIG. 9 and described above; cryptographic signature method for target memory segment is programmed into signature verification engine 122, as shown in FIG. 9 and described above; signature verification engine 122 is programmed as needed, by the CPU 116, to check the signature of the target memory segment at various time intervals or on demand, as shown in FIGS. 10-12 and described above; signature verification engine 122 is programmed, by the CPU 116, to perform various actions after the signature is checked such as raise interrupts, assert control lines, clear memory, etc., as shown in FIGS. 10-12 and described above. As such, the CPU 116 is operative to program programmable signature verification policy information 1026 into the programmable register set 802 during a secure boot process.

In a typical use-case, an executing computer program (function 1) may need to verify the signature of a target memory segment 804 which contains other executable program code (function 2). In this example, function 1 uses the signature verification engine 122 to check the signature of function 2 (e.g., software code target memory segment 804) against the known good signature each time function 1 wants to call function 2. If the signature verification engine 122 determines that the signatures match, then the signature verification engine 122 signals success and function 1 may then transfer control to function 2 via a function call. In a secure scenario, function 1 is somehow secure via code obfuscation or another method.

Alternatively, function 1 may want to check the signature of a target memory segment 804 containing data constants (e.g., data constants target memory segment 804). The signature verification engine may be programmed to automatically check the target memory segment 804 at intervals, for example, every 100 microseconds. If the signature comparison fails, the signature verification engine 122 signals via interrupts (e.g., over bus line 808) to the CPU 116 or via control signals (e.g., via bus line 806) to other parts of the system, and function 1 takes appropriate action.

By checking the target memory segment 804 at intervals or on-demand using the signature verification engine 122, any hacking attempts to alter the memory region 102 via viruses, malicious code, or other corruption can be detected since the memory region verification is on-going over time at intervals. Finally, in one embodiment, multiple signature verification engines may be implemented in system, allowing individual signature verification engine blocks to verify separate memory regions concurrently.

In an alternate embodiment of this invention, programmable signature verification policy information 1026 may indicate that instead of using a cryptographic signature, a shadow copy of the memory region containing program code or data could be kept in a private memory region, and a direct comparison could be made at intervals to determine if the shadow copy was different than the target memory segment 804. In this embodiment, the signature is the entire length of the memory segment, and the signature verification method is direct comparison.

Figure 14:
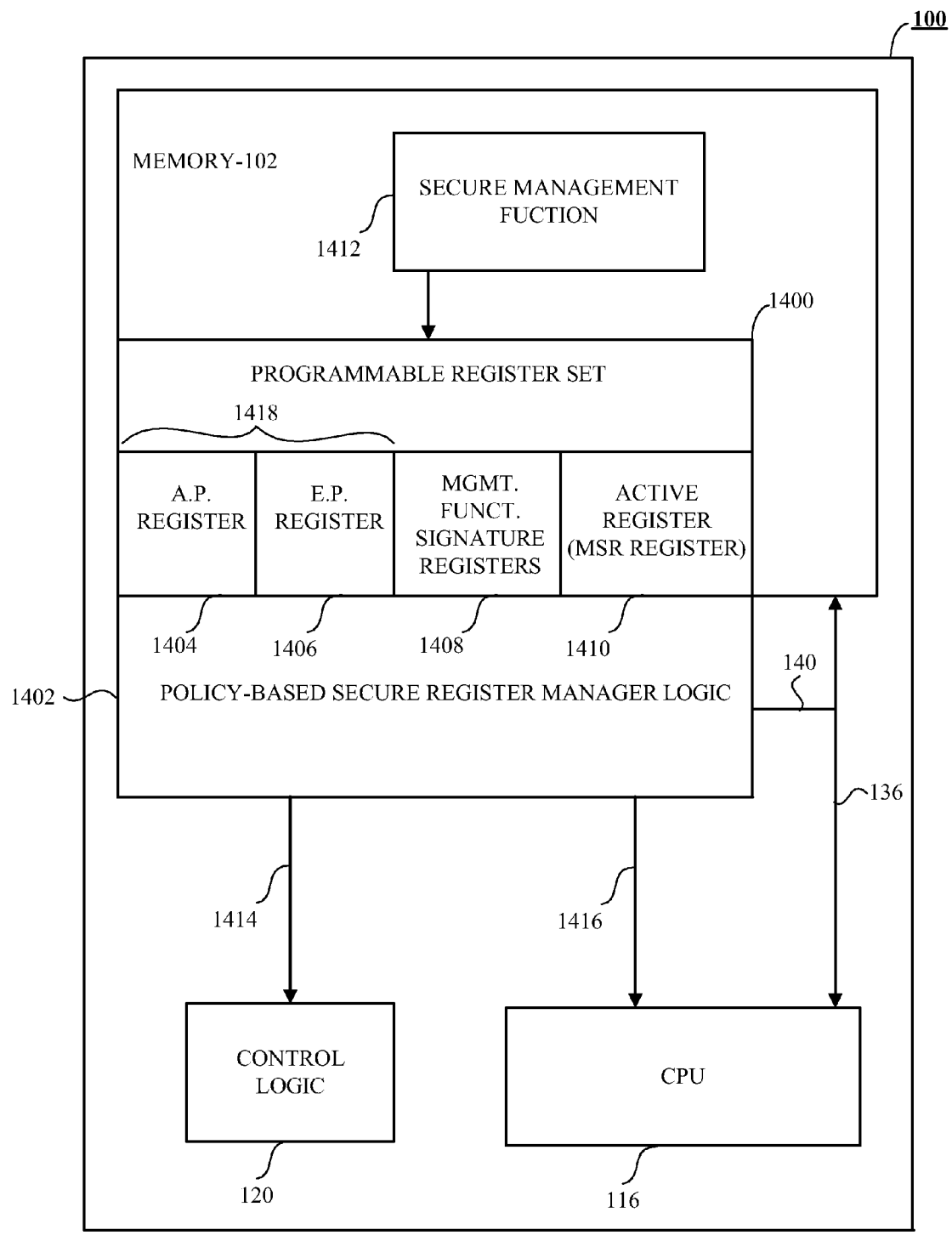
FIG. 14 is a block diagram generally depicting one example of a device for providing secure register access.

FIG. 14 is an exemplary functional block diagram generally depicting one example of a device 100 capable of providing secure register access. The device includes memory 102, control logic 120, a CPU 116, and policy-based secure register manager logic 1402.

The memory 102 is operative to store a secure management function 1412, which could be, for example, secure interrupt handler code 110. The policy-based secure register manager logic 1402 is operatively connected to a programmable register set 1400. As set forth above, the policy-based secure register manager logic 1402 and programmable register set 1400 could be contained within an integrated circuit 104. The programmable register set 1400 includes an access policy register 1404, an error policy register 1406, management function signature registers 1408, and an MSR register 1410 (i.e., active register). The access policy register 1404 and error policy register 1406 are further characterized as programmable MSR policy registers 1418.

The policy-based secure register manager logic 1402 is depicted as being in one-way communication with control logic 120 and CPU 116 over bus lines 1414 and 1416, respectively. The policy-based secure register manager logic 1402 is operative to transmit an external trigger signal to the control logic 120 over bus line 1414 and a CPU interrupt signal to the CPU 116 over bus line 1416. The CPU 116 is in two-way communication with memory 102 over data memory bus 136, which may be accessed by the policy-based secure register manager logic 1402 over bus line 140.

FIGS. 15-16 are a representation of a programmable register set 1400 in accordance with one embodiment of the disclosure. The programmable register set 1400 is operative to program and use a MSR register 1410. As shown in FIGS. 15-16, the programmable register set 1400 includes: management function signature registers 1408; an access policy register 1404; an error policy register 1406; and a MSR register 1410 (i.e., active register).

The management function signature registers 1408 include a management function pointer register 1500, a management function size register 1502, a management function signature type register 1504, and a management function signature register 1506. Although not shown in FIG. 15, there is also management function signature size register containing data representing the secure management function's cryptographic signature length. The management function pointer register 1500 contains data 1508 describing the secure management function's run-time memory address. The management function size register 1502 contains data 1510 describing the secure management function's length. The management function signature type register 1504 contains data 1512 representing the cryptographic signature method applied to the secure management function's signature, such as 0x1=SHA-1, 0x2=SHA-256, or any other suitable cryptographic signature method. The management function signature size register (not shown) includes data representing the secure management function's cryptographic signature length. Finally, the management function signature register 1506 contains data 1514 representing the secure management function's cryptographic signature.

The access policy register 1404 describes the access policy for the MSR register 1410 and is software-fused, meaning that it is written once after power-on and subsequently fused so that no changes are allowed during run-time. The access policy register 1404 contains programmable register access policy data 1516 describing the access policy for the MSR register 1410. The programmable register access policy data 1516 can be configured to allow the policy-based secure register manager logic 1402 to secure an MSR register 1410 via: write once register programming; signature verification-based register access; or register visibility control for access. For example, BIT 2: READ-ONLY AFTER WRITE is representative of programmable register access policy data 1516 that can be stored in the access policy register 1404 to secure the MSR register 1410 during run-time by providing write one register programming. BIT 1: MANAGED ACCESS VIA SIGNED FUNCTION is representative of programmable register access policy data 1516 that can be stored in the access policy register 1404 to secure the MSR register 1410 during run-time by providing signature verification-based register access. If BIT 1 is set, only the secure management function 1412 may access the MSR register, otherwise an access violation occurs and the error policy 1518 is enforced. BITS 3-7 are representative of programmable register access policy data 1516 that can be stored in the access policy register 1404 to secure the MSR register 1410 during run-time by providing register visibility control for access. As such, logic 1402 operatively responsive to the programmable register access policy data 1516 is disclosed. Furthermore, the logic 1402 may secure registers during run-time by providing: write once register programming based on the stored programmable register access policy data 1516; signature verification-based register access based on the stored programmable register access policy data 1516; or register visibility control for access based on the stored programmable register access policy data 1516.

The error policy register 1406 describes the error policy to be implemented when illegal register access occurs and is also software-fused. The error policy register 1406 contains programmable error policy data 1518 describing the error policy that the policy-based secure register manager logic 1402 is designed to control. For example, the policy-based secure register manager logic 1402 may control error policy by asserting a CPU interrupt over bus line 1416 if the programmable error policy data 1518 indicates that BIT 1 is set. Accordingly, the programmable register set 1400 further comprises programmable error policy data 1518 wherein the logic 1402 is operative to control error policy when illegal register access occurs in response to the programmable error policy data 1518. The error policy data (e.g., programmable error policy data 1518) is written to the MSR policy registers 1418 during the secure boot process. Furthermore, access policy is enforced during run-time based on the programmable register access policy data 1516, as shown in block 1706 of FIG. 17 and further described below.

The MSR register 1410 (i.e., active register) describes the register sought to be secured via the access policy register 1404. For example, this register may contain data 1520 representing application-specific register contents such as cryptographic public/private key pairs and/or any other suitable data. This data is written into the MSR register 1410 as part of a secure boot process, as shown in block 1704 of FIG. 17 and further described below. The intended use-case is to program/write the MSR register 1410 after power-on during a secure boot stage and software-fuse the programmable register access policy data 1516 for a given application such as digital rights management, or some other security system. As such, access policy data 1516 is written into programmable MSR policy registers 1418 (e.g., access policy register 1404 and/or error policy register 1406), as shown in block 1702 of FIG. 17 and further described below. An MSR register 1410 may be of arbitrary length and contain arbitrary information including data constants, addresses and address ranges, and/or arrays of program code. Any MSR registers 1410 may be designed as "fused" registers where a register may be an arbitrary amount of memory implemented as a shared memory register or dedicated hardware register. As such, the programmable register set 1400 comprises at least one managed secure register (MSR) register 1410 that securely stores data in compliance with the programmable register access policy data 1516.

Each register within the programmable register set 1400 includes size data 1522 (in bits) and access mode data 1524. The access mode data 1524 represents the access policy associated with each register. For example, the access mode data 1524 could be any one of the following: fused (write-once after power-on); managed (only programmable from a secure signed management function 1412); read; write; invisible after write (software fused register—only visible for write once after power-on); or hidden. A hidden access mode indicates that the register is only visible for read during specific times such as: during interrupt processing (such as NMI) to the secure interrupt handler code 110; during execution of the secure management function 1412; or when an external trigger signal is asserted. The access mode data 1524 corresponding to the MSR register 1410 is defined by the programmable register access policy data 1516. Accordingly, the MSR register 1410 may comprise access mode data 1524 defined by the programmable register access policy data 1516.

Figure 17:
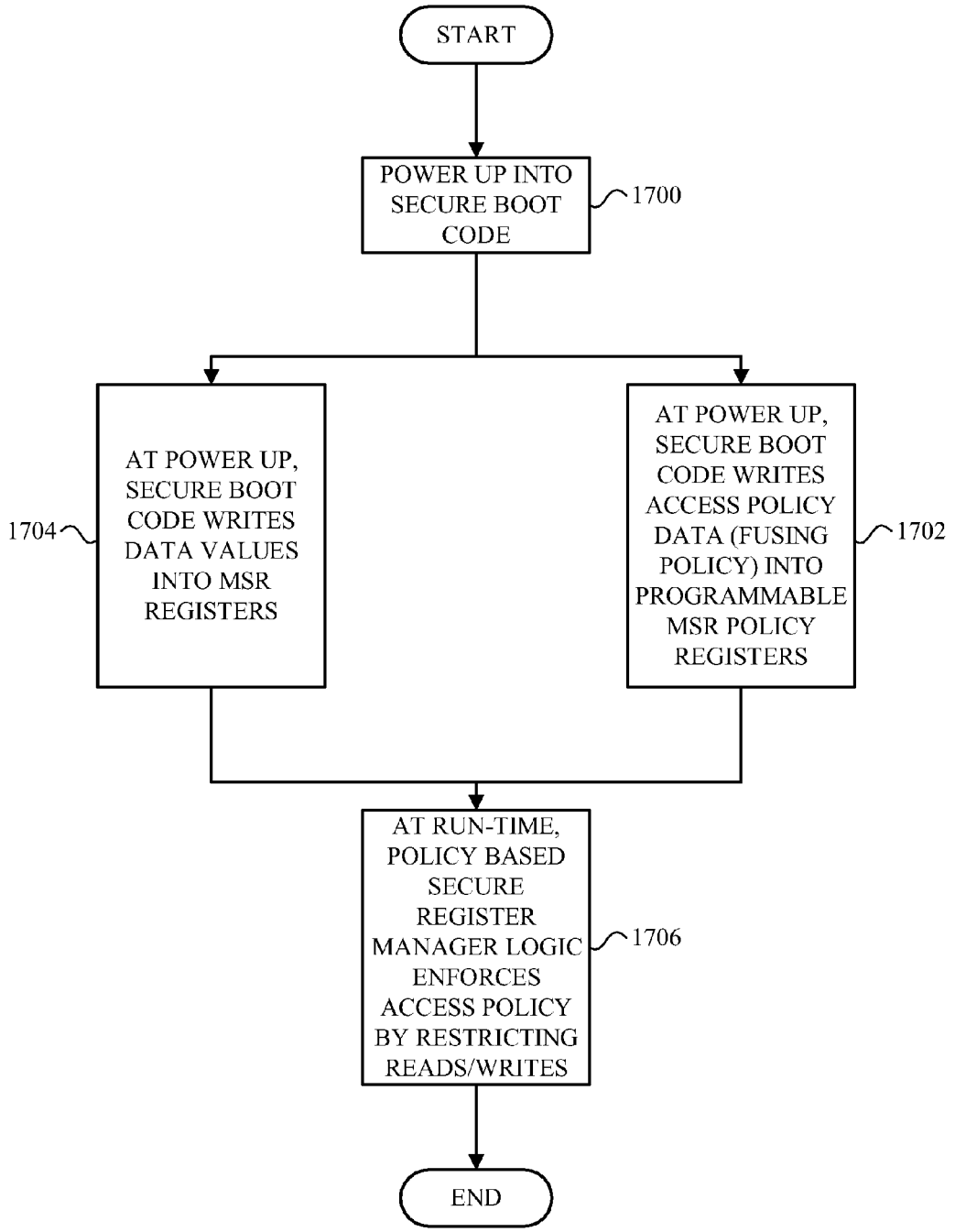
FIG. 17 is a flowchart illustrating a method for providing secure register access in accordance with one embodiment of the disclosure.

FIG. 17 is a flowchart illustrating a method for providing secure register access in accordance with one embodiment of the disclosure. At block 1700, a device 100 is powered up into secure boot code. At block 1702, access policy data is written into programmable MSR policy registers 1418 by secure boot code at power up. This is depicted in the access policy register 1404 shown in FIG. 15, where the access policy is configurable by setting a bit in the access policy register (e.g., setting BIT 2 configures the access policy to be read-only after write). At block 1704, the secure boot code writes data values into MSR registers 1410 at power up. These data values 1520 are stored within the MSR register 1410, as depicted in FIG. 16 and further described above. Furthermore, these data values 1520 may be, for example, application-specific register contents such as cryptographic public/private key pairs and/or any other suitable data. Finally, at block 1706, the policy-based secure register manager logic 1402 enforces the access policy (e.g., programmable register access policy data 1516) by restricting reads/writes to the MSR registers 1410 at run-time as discussed above.

This disclosure allows for several policy behavior variants including, but not limited to, the following examples. Software fused registers are one embodiment of this disclosure, where the MSR register 1410 may only be programmed (WRITE-once) after power-on to an application-specific value, typically during a secure boot process. Subsequently, the application-specific programmable register access policy 1516 is enforced. This may include options such as READ-ONLY, HIDDEN, or otherwise restricted and managed as allowed in this disclosure.

In another embodiment, hidden multi-port registers are utilized to provide secure register access. In this embodiment, an MSR register 1410 may have the WRITE path on one bus, and the READ path on another bus. This would allow boot code to WRITE and fuse the register on bus #1 during the boot process, render the register subsequently invisible on bus #1 for both READ/WRITE, and then provide READ access on an entirely separate bus #2, which may be an internal security bus used to read cryptographic keys or signature information from the MSR register 1410. To implement this policy in an embodiment, the MSR register 1410 may be programmed to be visible for READ while an external trigger signal is asserted by bus #2. This would allow registers to be initialized during the boot process and subsequently rendered invisible on a bus as soon as they were written. Also, registers using this model could be WRITE-ONLY on one bus, and READ-ONLY on another bus.

In another embodiment, restricted access registers are utilized to provide secure register access. In this embodiment, an MSR register 1410 may be further configured where the policy-based secure register manager logic 1402 enforces limited access to the MSR register's content to only a known signed code segment, which could contain, for example, the secure management function 1412. The address, length, and signature of the known signed code segment may be programmed into dedicated management function signature registers 1408, providing exclusive controls for both WRITE access and READ access to its contents, or limited access to code executing in a special CPU mode such as NMI or other secure interrupt handler code 110, or while a control signal is asserted.

A known signed code segment may contain several functions (e.g., a secure management function 1412) and data regions. In an embodiment, the mechanism for authenticating the known signed code segments could be the signature verification engine 122, as described above, which calculates a cryptographic signature over the known signed code segments and compares the signature with a known good signature stored in, for example, the management function signature registers 1408. If the signature matches, the policy-based secure register manager logic 1402 allows access according to the access policy data 1516 programmed and fused into the MSR register 1410. Thus, in this embodiment, logic 1402 is operatively responsive to the programmable register access policy data 1516 to secure MSR registers 1410 during run-time by providing signature verification-based register access based on the stored programmable register access policy data (e.g., by setting BIT 1 within the access policy register 1404) by using a signature verification engine 122 to verify a signature of a secure management function (i.e., known signed code segment) prior to allowing access to a secure register.

The trusted code within the known signed code segment's cryptographic signature is calculated when the code is built, recorded, and stored in a known location in the secure boot code. During the secure boot process, the known signed code segment's address, length, and signature information are programmed into software fused registers in the programmable register set 1400 (e.g., within the management function signature registers 1408), which uses the policy-based secure register manager logic 1402 to enforce restricted access policy (e.g., programmable register access policy data 1516) to only the trusted code. The policy-based secure register manager logic 1402 may be programmed to implement policy to restrict register access to only the trusted code in the signed segment, and generate various hardware events if an access violation occurs by non-trusted code. For example, programmable error policy data 1518 illustrates various hardware event that can be generated upon illegal MSR register access.

In one embodiment, the secure management functions 1412 will be located in known CPU interrupt vector code space, so that when a register read or write occurs on the MSR register 1410, the policy-based secure register manager logic 1402 can verify that the CPU 116 is in an interrupt handling state by checking interrupt lines (e.g., bus line 1416) and verify the signature of the secure interrupt handler code 110 at the correct interrupt vector location and execute the user programmed error policy 1518 if the access is not allowed.

In another embodiment, when a register read or write occurs on the MSR register 1410, a CPU 116 may expose a program counter (PC) register, allowing the policy-based secure register manager logic 1402 to read the PC register to determine the actual address of the code accessing the MSR register 1410 to verify that it resides within the known signed code segment and then verify the code signature of the segment using the signature verification engine 122. Finally, restricted access registers may be software-fused registers, normal registers, or otherwise restricted by policy methods allowed by this disclosure.

In an embodiment where software-fused registers and restricted access registers are used together, the following steps may be performed: at POWER-ON, the MSR register 1410 contents are cleared to zero; at BOOT, the secure boot code executes as follows: first, the programmable register access policy data 1516 is set into MSR registers 1410 (see block 1702 of FIG. 17 as described above) restricting access to a secure management function 1412; next, the secure management function signature information (e.g., the load address 1508, length 1510, cryptographic signature method 1512, and cryptographic signature 1514 of the trusted code segment containing the secure management function 1412) is set into the management function signature registers 1408, which may be MSR registers 1410 themselves; next, the secure management function 1412 is copied into run-time memory 102; and finally, the programmable error policy data 1518 is set into MSR registers 1410, where the programmable error policy data 1518 could direct the policy-based secure register manager logic 1402 to, for example, assert an external trigger (if, for example, BIT 2 within the error policy register 1406 was set) or make the MSR register invisible to all access (if, for example, BIT 4 within the error policy register 1406 was set).

Among other advantages, the disclosed method and apparatus provide secure register access by providing programmable policy options to restrict access to a managed set of registers. These policy options include, for example, WRITE-ONCE then subsequently READ-ONLY, WRITE-ONCE then subsequently INVISIBLE, VISIBLE ONLY DURING KNOWN INTERRUPTS (NMI for example), VISIBLE ONLY WHEN CERTAIN HW LINES ARE ACTIVE (multiport bus access policy), or VISIBLE ONLY DURING AUTHENTICATED FUNCTION ACCESS (managed access). During a secure boot process, the programmable policy is set and software-fused into the MSR registers so that the policy cannot be changed until a subsequent power-on. Other advantageous features include: software-fused write-once programming for run-time access policy; managed access enforced by policy-based secure register manager logic for a single secure signed function; and register hiding feature to control run-time bus-level visibility. Other advantages will be recognized by those of ordinary skill in the art.

In another embodiment, among other advantages, the disclosed method, apparatus, and device provide authentication of a set of target functions at run-time, managed execution of a set of target functions, a system for passing parameters to and from target functions, notification of completion status after calling target functions, and programmable completion status events. Other advantages will be recognized by those of ordinary skill in the art.

In yet another embodiment, among other advantages, the disclosed method, apparatus, and device provide authentication of target memory segments, including, for example, software code and/or data constants, during run-time. Other advantageous features include: the ability to interface to busses, switches, or interconnects within a system to access memory devices for READ/WRITE; a programmable register set for CONTROL and STATUS; the ability to be replicated as multiple core blocks to operate on multiple memory segments simultaneously; the ability to operate on memory segments at specific programmable time intervals; the ability to assert interrupts to the CPU after signature comparison; and the ability to assert trigger signals via control lines connected to other system logic. Other advantages will be recognized by those of ordinary skill in the art.

Also, integrated circuit design systems (e.g., work stations) are known that create integrated circuits based on executable instructions stored on a computer readable memory such as but not limited to CDROM, RAM, other forms of ROM, hard drives, distributed memory etc. The instructions may be represented by any suitable language such as but not limited to hardware descriptor language or other suitable language. As such, the logic (e.g., circuits) described herein may also be produced as integrated circuits by such systems. For example, an integrated circuit may be created using instructions stored on a computer readable medium that when executed cause the integrated circuit design system to create an integrated circuit that comprises: programmable register set operative to store programmable register access policy data; and logic operatively responsive to stored programmable register access policy data to secure registers during run-time by providing at least one of: write once register programming based on the stored programmable register access policy data; signature verification-based register access based on the stored programmable register access policy data; or register visibility control for access based on the stored programmable register access policy data. In another example, an integrated circuit may be created using instructions stored on a computer readable medium that when executed cause the integrated circuit design system to create an integrated circuit operative to: verify, during run-time, a signature of secure interrupt handler code in response to the calling function wanting to call the target function; verify, during run-time, at least a signature of a target function in response a successful signature verification of the secure interrupt handler code; and allow execution of the target function in response to the successful signature verification of the secure interrupt handler code and a successful signature verification of the target function; and/or evaluate, during run-time, stored programmable signature verification policy information associated with at least one target memory segment; and perform, during run-time, signature verification on the at least one target memory segment based on the stored programmable signature verification policy information to protect against programming attacks and/or data corruption.

The above detailed description of the invention and the examples described therein have been presented for the purposes of illustration and description only and not by limitation. It is therefore contemplated that the present invention covers any and all modifications, variations or equivalents that fall within the spirit and scope of the basic underlying principles disclosed above and claimed herein.

What is claimed is:

1. An apparatus for providing secure register access comprising:
    a programmable register set comprising at least one register comprising programmable register access policy data; and logic operatively responsive to the programmable register access policy data to secure other registers of the programmable register set during run-time by providing at least one of:
        write once register programming for one or more of the other registers of the programmable register set based on the stored programmable register access policy data;
        signature verification-based register access for one or more of the other registers of the programmable register set based on the stored programmable register access policy data; or
        register visibility control for access for one or more of the other registers of the programmable register set based on the stored programmable register access policy data.

2. The apparatus of claim 1, wherein the programmable register set further comprises programmable error policy data and wherein the logic is operative to control error policy when illegal register access occurs in response to the programmable error policy data.

3. The apparatus of claim 1, wherein the programmable register set comprises at least one managed secure register (MSR) register that securely stores data in compliance with the programmable register access policy data.

4. The apparatus of claim 3, wherein the MSR register comprises access mode data defined by the programmable register access policy data.

5. The apparatus of claim 1, wherein the logic is operatively responsive to the programmable register access policy data to secure the one or more of the other registers during run-time by providing signature verification-based register access based on the stored programmable register access policy data by using a signature verification engine to verify a signature of a secure management function prior to allowing access to a secure register.

6. A method, performed by an apparatus, for providing secure register access comprising:
    as part of a secure boot process, the apparatus writing data to a managed secure register (MSR) register and writing access policy data into programmable MSR policy registers wherein the MSR register securely stores data in compliance with the written register access policy data during run-time; and
    enforcing, by the apparatus, access policy for the MSR register during run-time based on the written register access policy data.

7. The method of claim 6 comprising:
    securing the MSR register during run-time of a device by providing at least one of:
        write once register programming based on the written register access policy data;
        signature verification-based register access based on the written register access policy data; or
        register visibility control for access based on the written register access policy data.

8. The method of claim 6 comprising:
    writing error policy data to the MSR policy registers during the secure boot process and controlling, during run-time, error policy when illegal register access occurs in response to written error policy data.

9. The method of claim 7 comprising:
    providing signature verification-based register access based on the written register access policy data by using a signature verification engine to verify a signature of a secure management function prior to allowing access to the MSR register.

10. The method of claim 7, wherein the secure management function is located in known CPU interrupt vector code space, the method further comprising:
    in response to a register read or write occurring on the MSR register:
        verifying that a CPU is in an interrupt handling state by checking interrupt lines;
        verifying a signature of secure interrupt handler code at a correct interrupt vector location; and
        executing an error policy if the access is not allowed.

11. The method of claim 6 comprising:
    in response to a register read or write occurring on the MSR register:
        exposing a program counter register with a CPU;
        reading the program counter register to determine an actual address of code
        accessing the MSR register to verify that the code resides within a known signed code segment; and
        verifying a signature of the known signed code segment.

12. A non-transitory computer readable medium comprising:
  instructions stored on the computer readable medium that when executed cause an integrated circuit design system to create an integrated circuit that comprises:
    a programmable register set comprising at lease one register operative to store programmable register access policy data; and
    logic operatively responsive to stored programmable register access policy data to secure other registers of the programmable register set during run-time by providing at least one of:
      write once register programming for one or more of the other registers of the programmable register set based on the stored programmable register access policy data;
      signature verification-based register access for one or more of the other registers of the programmable register set based on the stored programmable register access policy data; or
      register visibility control for access for one or more of the other registers of the programmable register set based on the stored programmable register access policy data.

* * * * *